US008787478B2

(12) United States Patent
Sasaki

(10) Patent No.: US 8,787,478 B2
(45) Date of Patent: Jul. 22, 2014

(54) WIRELESS COMMUNICATION SYSTEM, RECEIVING APPARATUS, TRANSMITTING APPARATUS, WIRELESS COMMUNICATION METHOD, RECEIVING METHOD, AND TRANSMITTING METHOD

(75) Inventor: Eisaku Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/743,554

(22) PCT Filed: Dec. 1, 2008

(86) PCT No.: PCT/JP2008/071782
§ 371 (c)(1),
(2), (4) Date: May 18, 2010

(87) PCT Pub. No.: WO2009/069798
PCT Pub. Date: Jun. 4, 2009

(65) Prior Publication Data
US 2010/0290552 A1 Nov. 18, 2010

(30) Foreign Application Priority Data

Nov. 30, 2007 (JP) ................................ 2007-310697

(51) Int. Cl.
*H04B 7/02* (2006.01)
(52) U.S. Cl.
USPC ............ 375/267; 375/316; 375/346; 375/295
(58) Field of Classification Search
USPC .................................. 375/267, 316, 346, 295
See application file for complete search history.

(56) References Cited

U.S. PATENT DOCUMENTS

| 5,751,027 | A | * | 5/1998 | Sawada et al. ................ 257/192 |
| 2002/0191535 | A1 | | 12/2002 | Sugiyama et al. |
| 2005/0239406 | A1 | * | 10/2005 | Shattil .......................... 455/63.1 |
| 2006/0018394 | A1 | * | 1/2006 | van Zelst et al. ............. 375/260 |
| 2008/0317014 | A1 | * | 12/2008 | Veselinovic et al. .......... 370/380 |

FOREIGN PATENT DOCUMENTS

| CN | 1380778 A | 11/2002 |
| JP | 2004179822 A | 6/2004 |
| JP | 2004201154 A | 7/2004 |
| JP | 2005192185 A | 7/2005 |

(Continued)

OTHER PUBLICATIONS

Chinese Office Action for CN200880118542.1 dated Aug. 2, 2012.

(Continued)

*Primary Examiner* — Leila Malek
(74) *Attorney, Agent, or Firm* — Sughrue Mion, PLLC

(57) ABSTRACT

The wireless communication system is a MIMO communication system that uses a plurality of antennas to form a plurality of fixed transmission channels, and includes a transmitting section and a receiving section. The transmitting section performs MIMO spatial multiplexing as well as dual polarization transmission of transmitting two independent signals in the same band by using two mutually orthogonal polarizations of radio waves as signals to be transmitted from respective antennas on a transmitting side. The receiving section includes an inference canceller and a MIMO signal processing circuit that is connected to the interference canceller. The interference canceller performs signal processing for eliminating an interference component between the polarizations by adaptive control on signals received by respective antennas on a receiving side. The MIMO signal processing circuit performs signal processing for MIMO spatial demultiplexing independent of the signal processing of the interference canceller.

12 Claims, 15 Drawing Sheets

(56) References Cited

FOREIGN PATENT DOCUMENTS

| JP | 2007189306 A | 7/2007 |
|---|---|---|
| WO | 02/093784 A1 | 11/2002 |
| WO | 2005/099129 A1 | 10/2005 |
| WO | 2007/132260 A1 | 11/2007 |
| WO | 2008059985 A | 5/2008 |
| WO | 2009/069798 A1 | 6/2009 |

OTHER PUBLICATIONS

International Search Report for PCT/JP2008/071782 mailed Mar. 10, 2009.

J. Namiki et al., "Adaptive Receiver for Cross-Polarized Digital Transmission", International Conference on Communications, Jun. 14-18, 1981, Institute of Electrical and Electronics Engineers, Inc., 1981, pp. 46.3.1-46.3.5.

P. F. Driessen et al., "On the Capacity Formula for Multiple Input-Multiple Output Wireless Channels: A Geometric Interpretation", IEEE Transaction on Communication, vol. 47, No. 2, Feb. 1999, pp. 173-176.

H Taoka et al., "Field Experiments on 1-Gbps High-Speed Packet Transmission Using MIMO Multiplexing with Cross-Polarized Antennas", IEICE Technical Report, Aug. 24, 2006, pp. 13-18.

D. N. Kumar et al., "Development of a MIMO Experimental System having a Function of Space and Polarization Diversity", IEICE Technical Report, Jul. 23, 2003, pp. 133-138.

Yu Deng, et al., "Performance of MIMO Systems with Combined Polarization Multiplexing and Transmit Diversity", 2005 IEEE, May 30, 2005, pp. 869-873, XP10855532. Cited in EP Search Report.

Yu Deng, et al., "Performance of 4-D Trellis-Coded Modulation in the Presence of Polarization Multiplexing", 2005 IEEE 16th International Symposium on Personal, Indoor and Mobile Radio Communications, Sep. 11, 2005, pp. 1091-1095, XP10926513. Cited in EP Search Report.

Rohit U. Nabar et al., "Performance of Multiantenna Signaling Techniques in the Presence of Polarization Diversity", IEEE Transactions on Signal Processing, vol. 50, No. 10, Oct. 1, 2002, pp. 2553-2562, XP11080255. Cited in EP Search Report.

The Extended European Search Report of EP Application No. 08853719.6 dated Jan. 17, 2014.

Japanese Office Action for JP Application No. 2013-106373 mailed on Apr. 18, 2014 with English Translation.

* cited by examiner

FIG.1 —Prior Art—

WIRELESS COMMUNICATION SYSTEM, RECEIVING APPARATUS, TRANSMITTING APPARATUS, WIRELESS COMMUNICATION METHOD, RECEIVING METHOD, AND TRANSMITTING METHOD

TECHNICAL FIELD

The present invention relates to a wireless communication system that uses microwaves or millimeter waves, and more particularly to a wireless communication system, a receiving apparatus, a transmitting apparatus, a wireless communication method, a receiving method, and a transmitting method for higher capacity transmission within a limited band.

BACKGROUND ART

Microwave or millimeter wave communication systems, which are line-of-sight communication systems with fixed transmitting and receiving stations, have recently been growing rapidly in demand as a mobile communications infrastructure. With the increasing traffic of the mobile communications, a further increase in the transmission capacity has been demanded.

According to such a market demand, dual polarization transmission with XPICs (Cross Polarization Interference Cancellers), which have conventionally been used in trunk systems, have come into standard use. A typical high-capacity system at present is configured to use 128 QAM (Quadrature Amplitude Modulation) with a bandwidth of 28 MHz to transmit two STM (Synchronous Transfer Mode)-1 signals. To increase the transmission capacity beyond such a system, the number of modulation levels can be made greater than 128 and the bandwidth wider than 28 MHz.

Increasing the number of modulation levels, however, has only a limited effect of capacity increase relative to an increase of what is called C/N (Carrier to Noise power ratio), resulting in the disadvantage of lower cost efficiency. Widening the bandwidth reduces the system gain as much as the noise bandwidth, with the disadvantage of increased device power consumption. Wider bandwidths (such as 56 MHz) may be unavailable in some countries. High frequency bands of 60 GHz and above can be used to provide a wide band, whereas too high frequencies increase the parts cost and have the disadvantage of an extremely short transmission range due to radio wave absorption by the air.

Under the foregoing limitations, it has been difficult to further increase microwave or millimeter wave communication systems in capacity.

As mentioned above, in a microwave or millimeter wave communication system that has fixed transmitting and receiving stations and uses a band of several to several tens of gigahertzs, the dual polarization transmission method of using two polarizations of radio waves to transmit two independent signals in the same frequency band is employed as a means for increasing the transmission capacity. Since the transmission quality deteriorates due to cross polarization interference, there are implemented XPICs for canceling the interference. The XPICs make reference to signals of the other polarizations to extract interference components leaking in their own polarizations, and subtract the interference components from the signals of their own polarizations for interference cancellation (for example, see NPL 1). The dual polarization transmission method with XPICs doubles the transmission capacity for an identical bandwidth. To achieve a further increase in capacity, however, there has been no means other than to increase the bandwidth.

By the way, mobile communications and wireless LAN systems, which are non-line-of-sight communication systems, have been increased in transmission capacity by MIMO (Multiple-Input Multiple-Output) technologies which use a plurality of antennas for transmission and reception. A plurality of signals are received on the receiving side because of ambient reflection. The state of reflection varies with time depending on the movement of the communication device itself or surrounding objects that are causing scattering. The use of a plurality of antennas for transmission and reception is equivalent to a situation where there are a plurality of transmission channels, so that independent signals corresponding to the number of antennas can be transmitted in the same frequency band. Nevertheless, there is no mobile communications system that uses dual polarization.

It has heretofore been held that the same MIMO technologies as those of mobile systems are not applicable to microwave or millimeter wave communication systems for line-of-sight communications. This is due to the following reason. The transmission-reception distance (for example, several to several tens of kilometers) is extremely large as compared to a feasible spacing for antenna installation (such as several meters), and in the absence of constant scattering environment, the signals transmitted from respective antennas have an extremely high correlation with each other. As a result, the transmission channels appear to be only one, and the number of signals that can be transmitted in the same frequency band becomes one. That is, in line-of-sight communication systems, MIMO-based parallel communication channels such as in practical use with mobile units do not hold.

In a certain condition, however, it is possible to form a plurality of independent communication channels even in a line-of-sight scatterless environment. The principle is described on pp. 174-5 of NPL 2, a conventional art document relevant to this application, as follows. With widely spaced antennas, signals that arrive at a single receiving antenna from a plurality of transmitting antennas have almost the same transmission distances and can thus be considered to have the same amplitude. The slight differences in the transmission distance, however, result in different phases due to the high frequency. The presence of such a phase difference makes the rank of the communication channel matrix H (the elements of H are the transfer functions between the antennas, rendered in a complex representation of amplitude and phase) equal to the order of the matrix H. That is, there are as many independent communication channels as the number of antennas. For example, with arrays of two antennas, the matrix H is a 2-by-2 square matrix having a rank of 2, so that there are formed two communication channels. When using arrays of two antennas for transmission and reception, respectively, the communication channel matrix H is given by the following:

$$H = \begin{pmatrix} h_{11} & h_{12} \\ h_{21} & h_{22} \end{pmatrix} \qquad \text{[Eq. 1]}$$

where $h_{ij}$ is the complex transfer function (phase term*amplitude term) from a transmitting antenna j to a receiving antenna i (the latter suffix indicates the transmitting side). The rank of the communication channel matrix H is the number of independent communication channels.

What is important here is that the formation of communication channels based on such a principle is a fixed one under geometric conditions, not stochastically variable as with ordinary MIMO. As an example, description will be given of the configuration of FIG. 1. With a transmission range of R and an RF frequency of f1, the antenna installation spacing is set so that signals transmitted from the two antennas on the transmitting side (Tx) are received by a single antenna on the receiving side (Rx) with a phase difference (in the diagram, the difference between R1 and R3 and the difference between R2 and R4) of $\lambda/4$ ($\lambda$ is one wavelength). The signals A and B to be transmitted from the two antennas are given a difference of $\pi/2$ in phase. Consequently, the signal A is enhanced and the signal B is cancelled out at either one of the receiving antennas, and vice versa at the other antenna. This makes it possible to separate the two signals transmitted at the same frequency into two on the receiving side. Such signal separation does not need a scattering environment for the communication channels unlike ordinary stochastic MIMO.

The principle of the MIMO system described in NPL 2, however, holds only in very special conditions. The principle has thus been impractical since such conditions easily fail to hold because of an error in the actual installation spacing between the antennas or due to small swings of the antennas in the wind or by vibration.

As a means for solving the problem, unpublished PTL 1 which the applicant has filed as relevant technology prior to this application describes a MIMO system that can apply SVD (Singular Value Decomposition), which is used in mobile MIMO, and other matrix operations to form stable communication channels despite the presence of the foregoing variable factors.

In other words, the MIMO signal processing technology described in unpublished PTL 1 can be applied to the principle configuration shown in NPL 2 to increase the transmission capacity of even a line-of-sight communication system through stable spatial multiplexing.

CITATION LIST

Patent Literature

{NPL 1} Junji Namiki and Shigeru Takahara, "Adaptive Receiver for Cross-Polarized Digital Transmission," International Conference on Communications, Jun. 14-18, 1981, Conference Record. Volume 3. (A82-43778 22-32) New York, Institute of Electrical and Electronics Engineers, Inc., 1981, p. 46.3.1-46.3.5.

{NPL 2} P. F. Driessen and G. J. Foschini, "On the capacity formula for multiple input multiple output wireless channels: a geometric interpretation," IEEE Trans. Comm., vol. 47, no. 2, pp. 173-176, February 1999.

{PTL 1} Japanese Patent Application No. 2006-312277, "System and Method of MIMO Communication with Deterministic Communication Channels," filed on Nov. 17, 2006 (unpublished).

SUMMARY OF INVENTION

Technical Problem

The actually-demanded transmission capacity, in specific terms, is 1 Gbps (Gbit/sec) which is needed for GbE (Gigabit Ethernet™).

To implement 1 Gbps by MIMO alone with a bandwidth of 56 MHz needs a four-antenna configuration, which quadruples the antenna cost as compared to a non-MIMO system. Antennas for use in microwave and millimeter wave communication systems are several tens of centimeters to several meters in size, and are installed on antenna towers, building roofs, etc. Such antennas are not small in size or low in cost unlike wireless LAN antennas. The use of arrays of four relatively large and expensive antennas is thus often impractical in terms of securing installation locations and in terms of cost. Dual polarization transmission needs no additional antenna, so that a four times increase of the transmission capacity by the combination of two-antenna MIMO and dual polarization transmission provides a configuration of high cost efficiency.

In the meantime, wider bandwidths and a modulation method of increased modulation levels have the following problem.

Existing devices are only capable of STM-4 (620 Mbps) even by using a 56-MHz bandwidth for dual polarization transmission. To double the capacity, it is needed that either the bandwidth be increased to 112 MHz, or 16384 QAM capable of transmitting 14 bits with a single symbol be used. Neither is practical, considering bands up to 38 GHz.

To increase the capacity by widening the bandwidth has the disadvantage that available bandwidths are subject to official regulations. Another disadvantage of increasing the capacity by widening the bandwidth is that the system gain, an important index for wireless communication systems, will drop. The reason is that the increased signal bandwidth also increases the bandwidth of noise, which lowers the threshold electric field for reception. A sufficiently wide bandwidth is available in 60-GHz and higher bands, whereas such bands are incapable of long-distance transmission due to high absorption by the air.

If the spatial multiplexing described in NPL 2 and unpublished PTL 1 can be combined with conventional XPIC-based dual polarization transmission, the transmission capacity of the microwave or millimeter wave communication system can be made twice by the polarization multiplexing and twice further by the two-antenna MIMO spatial multiplexing, i.e., four times in total.

Nevertheless, NPL 2 and unpublished PTL 1 only contain the description of spatial multiplexing but none of the combination with a dual polarization transmission method.

In a wireless communication system that combines MIMO described in NPL 2 and unpublished PTL 1 with XPICs, four signals are received as synthesized spatially and in polarization as shown in a reference example to be described later (see FIG. 2). For proper demodulation, it would be considered necessary to arrange four circuits that eliminates interference of three other signals. There is even no guarantee that such a configuration functions correctly. It is therefore considered to be difficult to simply combine spatial multiplexing and dual polarization transmission.

In view of the foregoing problems, it is an object of the present invention to provide a system that combines MIMO spatial multiplexing and dual polarization transmission, and to construct the system with a simple circuit configuration, thereby providing a wireless communication system which accurately demodulates signals that are multiplexed doubly, both spatially and in polarization.

Solution to Problem

To achieve the foregoing problem, a wireless communication system according to the present invention is a MIMO (Multiple-Input Multiple-Output) communication system that uses a plurality of antennas to form a plurality of fixed transmission channels, the wireless communication system including: a transmitting section that performs MIMO spatial multiplexing as well as dual polarization transmission of transmitting two independent signals in the same band by using two mutually orthogonal polarizations of radio waves as signals to be transmitted from respective antennas on a transmitting side; and a receiving section that includes an interference canceller which performs signal processing for eliminating an interference component between the polarizations by adaptive control on signals received by respective antennas on a receiving side, and a MIMO signal processing circuit which performs signal processing for demultiplexing of the MIMO spatial multiplexing independent of the signal processing of the interference canceller.

A receiving apparatus according to the present invention is a receiving apparatus of a MIMO (Multiple-Input Multiple-Output) communication system that uses a plurality of antennas to form a plurality of fixed transmission channels, the receiving apparatus including: an interference canceller that performs signal processing for eliminating an interference component between two mutually orthogonal polarizations of radio waves by adaptive control on signals received by respective antennas on a receiving side; and a MIMO signal processing circuit that is connected to the interference canceller and performs signal processing for MIMO spatial demultiplexing independent of the signal processing of the interference canceller.

A transmitting apparatus according to the present invention is a transmitting apparatus of a MIMO (Multiple-Input Multiple-Output) communication system that uses a plurality of antennas to form a plurality of fixed transmission channels, the transmitting apparatus performing MIMO spatial multiplexing as well as dual polarization transmission of transmitting two independent signals in the same band by using two mutually orthogonal polarizations of radio waves as signals to be transmitted from respective antennas on a transmitting side.

A wireless communication method according to the present invention is a wireless communication method of a MIMO (Multiple-Input Multiple-Output) communication system that uses a plurality of antennas to form a plurality of fixed transmission channels, the method including: performing MIMO spatial multiplexing as well as dual polarization transmission of transmitting two independent signals in the same band by using two mutually orthogonal polarizations of radio waves as signals to be transmitted from respective antennas on a transmitting side; and performing signal processing for eliminating an interference component between the polarizations by adaptive control on signals received by respective antennas on a receiving side and signal processing for demultiplexing of the MIMO spatial multiplexing independently of each other.

A receiving method according to the present invention is a receiving method of a MIMO (Multiple-Input Multiple-Output) communication system that uses a plurality of antennas to form a plurality of fixed transmission channels, the method including performing signal processing for eliminating an interference component between the polarizations by adaptive control on signals received by respective antennas on a receiving side and signal processing for MIMO spatial demultiplexing independently of each other.

A transmitting method according to the present invention is a transmitting method of a MIMO (Multiple-Input Multiple-Output) communication system that uses a plurality of antennas to form a plurality of fixed transmission channels, the method including performing MIMO spatial multiplexing as well as dual polarization transmission of transmitting two independent signals in the same band by using two mutually orthogonal polarizations of radio waves as signals to be transmitted from respective antennas on a transmitting side.

A demodulator according to the present invention is a demodulator of a MIMO (Multiple-Input Multiple-Output) communication system that uses a plurality of antennas to form a plurality of fixed transmission channels, the demodulator including: an interference canceller that performs signal processing for eliminating an interference component between two mutually orthogonal polarizations of radio waves by adaptive control; and a MIMO signal processing circuit that is connected to the interference canceller and performs signal processing for MIMO spatial demultiplexing independent of the signal processing of the interference canceller.

A modulator according to the present invention is a modulator of a MIMO (Multiple-Input Multiple-Output) communication system that uses a plurality of antennas to form a plurality of fixed transmission channels, the modulator performing signal processing for performing MIMO spatial multiplexing as well as dual polarization transmission of transmitting two independent signals in the same band by using two mutually orthogonal polarizations of radio waves as signals to be transmitted from respective antennas on a transmitting side.

A signal processing circuit according to the present invention is a signal processing circuit of a MIMO (Multiple-Input Multiple-Output) communication system that uses a plurality Of antennas to form a plurality of fixed transmission channels, the signal processing circuit including: an interference canceller that performs signal processing for eliminating an interference component between two mutually orthogonal polarizations of radio waves by adaptive control; and a MIMO signal processing circuit that is connected to the interference canceller and performs signal processing for MIMO spatial demultiplexing independent of the signal processing of the interference canceller.

A semiconductor device according to the present invention includes the signal processing circuit described above.

Advantageous Effects of Invention

According to the present invention, it is possible to provide a system that combines MIMO spatial multiplexing and dual polarization transmission, and to construct the system with a simple circuit configuration, thereby providing a wireless communication system which accurately demodulates signals that are multiplexed doubly, both spatially and in polarization.

REFERENCE SIGNS LIST

Figure 1:
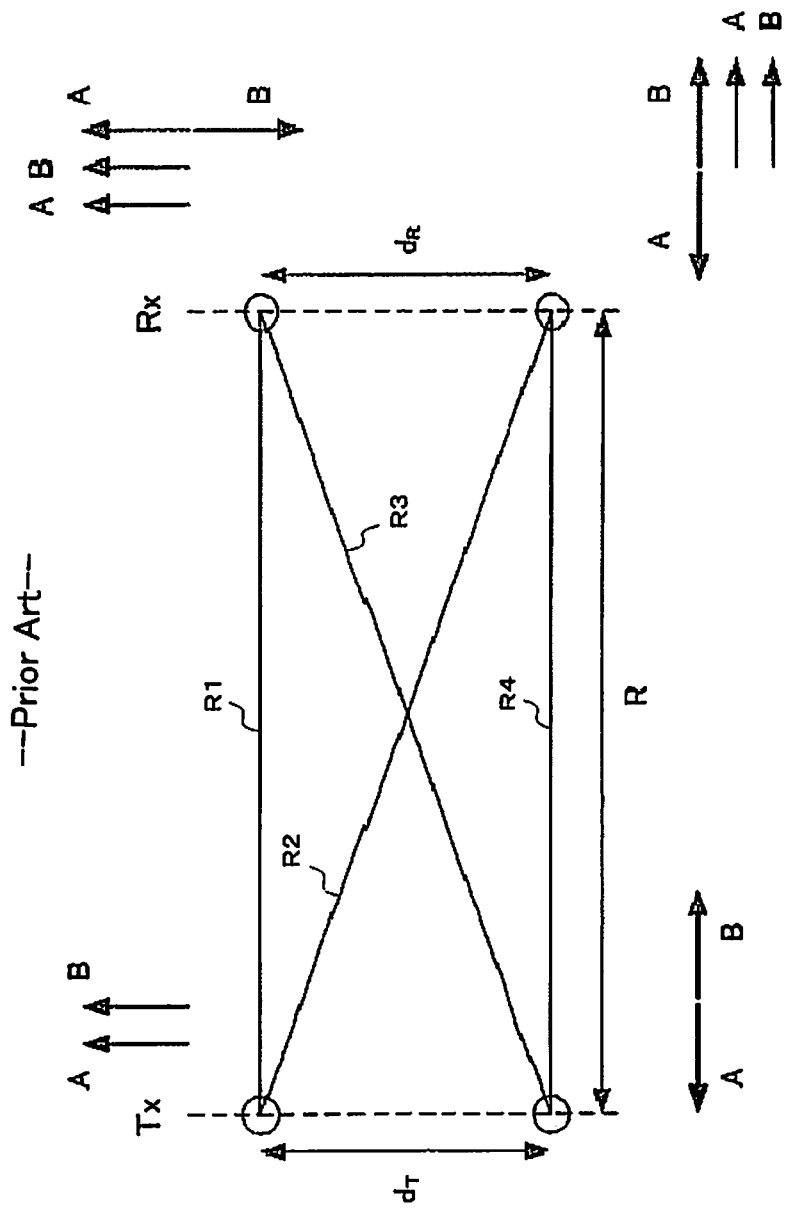
FIG. 1 A diagram for explaining MIMO based on a difference in the channel length according to the relevant technology.

11: first receiving antenna
12: second receiving antenna
13: first transmitting antenna
14: second transmitting antenna
21, 22, 23, 24: receiver
31, 32: demodulator (example 1)
41, 42: MIMO signal processing circuit
51, 52, 53, 54: interference canceling unit (example 1)
61, 62, 63, 64: interference canceling unit (example 2)
71, 72, 73, 74: demodulator (example 2)
101, 102, 103, 104: transmitter
201, 202, 203, 204: modulator

DESCRIPTION OF EMBODIMENTS

Now, an exemplary embodiment of a wireless communication system, receiving apparatus, transmitting apparatus, wireless communication method, receiving method, and transmitting method according to the present invention will be described in detail with reference to the drawings.

Before the detailed description of examples of the present invention, a related reference example (configuration example) will be described with reference to FIG. 2.

First consider a MIMO communication system that uses a plurality of antennas to form a plurality of fixed transmission channels, in which MIMO spatial multiplexing and dual polarization transmission using two respective different polarizations of radio waves, i.e., V (Vertical) polarization and H (Horizontal) polarization are used in combination. In such a case, the receiving side needs to perform two types of signal processing, or MIMO spatial demultiplexing and interference cancellation for canceling interference components between the different polarizations. Here, each of the two types of signal processing, MIMO spatial demultiplexing and cross polarization interference cancellation, needs to be performed with accuracy equivalent to when the signal processing is performed alone. FIG. 2 shows an example of a circuit configuration for that purpose.

Figure 2:
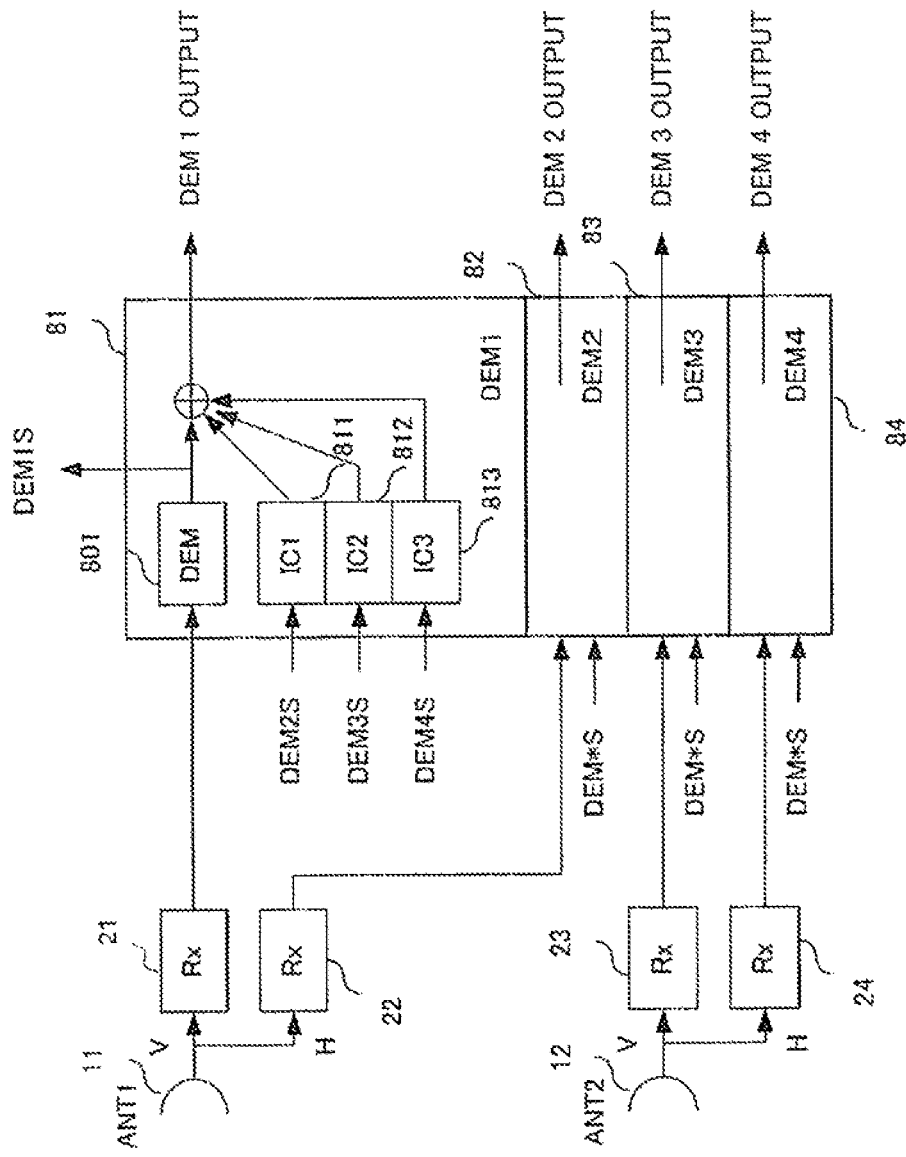
FIG. 2 A block diagram of the receiving side of a wireless communication system according to a reference example of the present invention.

The wireless communication system shown in FIG. 2 is an application to a receiving set that combines MIMO and XPICs. The receiving set shown in the diagram includes two antennas (ANT1 and ANT2) 11 and 12, four receivers (Rx) 21 to 24 which are provided on the output sides for both V-polarized and H-polarized radio waves, and four demodulators (DEM circuits) 81 to 84.

The demodulator 81 includes a DEM 801 which constitutes an equalizer for its own polarization, and three interference cancellers (IC1 to IC3) 811 to 813. The other demodulators 82 to 84 have the same configuration. The input signals of the respective interference cancellers 811 to 813 are the results of semi-synchronous detection in the respective modulators (DEM1 to DEM4) 81 to 84, rendered in digital values (DEM*S (* is any of numbers 1 to 4 except its own number)).

The demodulators 81 to 84 are the implementation of the function of canceling cross polarization interference occurring from the dual polarization transmission with V-polarized and H-polarized radio waves and the function of MIMO spatial demultiplexing, in the form of interference cancellers arranged in parallel on the output side of the antennas 11 and 12. In such an example, one signal to be demodulated is directly under two interferences including one from spatial multiplexing of the same polarization and one with the other polarization on the same antenna. The interfering signals themselves are also interfered with other signals. That is, a signal undergoes interferences from all the other signals. The solution to this needs interference cancellers for canceling the respective three interferences. This is what the three interference cancellers 811 to 813 shown in FIG. 2 are. Their outputs are all subtracted for interference cancellation.

The demodulators 81 to 84 have the same configuration each. The interference cancellers 811 to 813 are not shareable since all the input signals are respectively different. A single demodulator is composed of three interference cancellers of large circuit scale (four, if the equalizer DEM 801 of its own polarization is included). The entire circuit scale is four times as much. Such a configuration may be beyond the range of practical feasibility in terms of cost and power consumption.

As described above, if the wireless communication system that combines MIMO and XPICs is configured to implement both the function of canceling cross polarization interferences occurring from dual polarization transmission and the function of MIMO spatial demultiplexing in parallel on the output side of the antennas, there are the problems of increased circuit scale and that the range of practical feasibility may be exceeded in terms of cost and power consumption.

To solve the foregoing problem, examples of the present invention provide a MIMO wireless communication system that uses a plurality of antennas to form a plurality of fixed transmission channels, in which the function of demultiplexing spatially-multiplexed MIMO signals and the function of cross polarization interference cancellation (XPIC) are provided on the receiving side, and the two functions of demultiplexing the spatially-multiplexed signals and cross polarization interference cancellation are independently connected in cascade so that either one of the functions is processed first before the other signal processing. Such a wireless communication system with a simple configuration transmits four or more independent signals in the same band.

More specifically, in the examples of the present invention, the two functions including the signal processing for spatial demultiplexing and the XPIC for canceling cross polarization interference are provided on the receiving side. The two functions are connected in cascade so that either one of the two types of multiplexing is demultiplexed or interference-cancelled first before the other signal processing. This makes it possible to demultiplex the two types of multiplexed signals without a drop in accuracy by using only minimum necessary circuits including the signal processing circuits necessary for MIMO and the XPICs.

The characteristics are summarized below.

The spatial multiplexing described in NPL 2 is based on a difference in signal phase that is ascribable to a difference in channel length, and therefore also applies to line-of-sight communications. The precondition is extremely strict, however, and easily fails to hold because of existing degradation factors. As a compensation; the signal processing circuit used in ordinary MIMO according to unpublished PTL 1, a prior application of the applicant, is employed. The application of mutually orthogonal pilot signals to the signals to be transmitted makes it possible to extract phase information on the signals to be demodulated without using other interference components. Factors irrelevant to a phase difference, such as cross polarization interference, have no effect on the conditionality of MIMO.

Meanwhile, cross polarization interference cancellation is performed by extracting interference components with reference to the interfering source signals. The signal processing for interference cancellation will not be affected at all by whether the interfering signals and the interfered signals are spatially multiplexed or not.

The spatial multiplexing and cross polarization interference are capable of independent signal processing with no effect on each other. Consequently, the system that combines the two types of multiplexing, spatial and polarization, only needs circuits that are needed for a spatial multiplexing-specific system and a dual polarization transmission-specific system.

Hereinafter, examples of the present invention will be described with reference to the drawings, in conjunction with the most basic configuration where the numbers of antennas for reception and transmission are two.

Example 1

Figure 5:
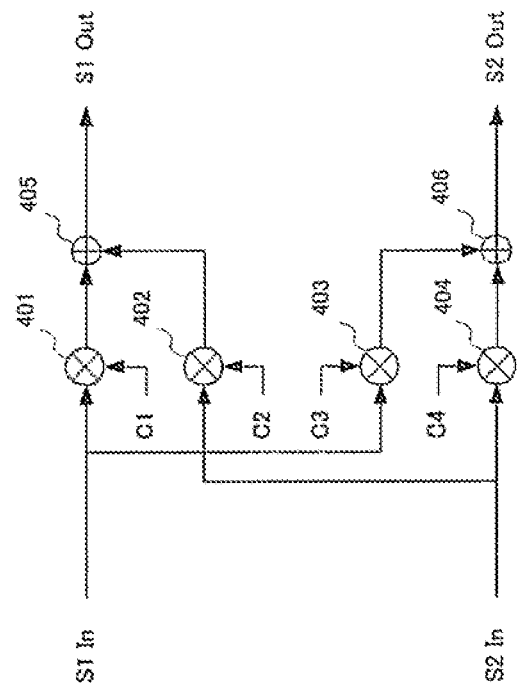
FIG. 5 A block diagram of a DEM circuit of FIG. 4.

Initially, the configuration and operation of the transmitting side (transmitting station, transmitting set, transmitting apparatus, or transmitting section) and the receiving side (receiving station, receiving set, receiving apparatus, or receiving section) of a communication system according to example 1 of the present invention will be described separately. As for the configuration related to MIMO signal processing, both the transmitting side and the receiving side are based on configuration example 4 that is shown in FIG. 5 of PTL 1 (where the unitary matrix of the communication channel matrix H is calculated on the receiving side; independent local oscillators for respective antennas are used both on the transmitting side and the receiving side).

[Configuration of Transmitting Side]

Figure 3:
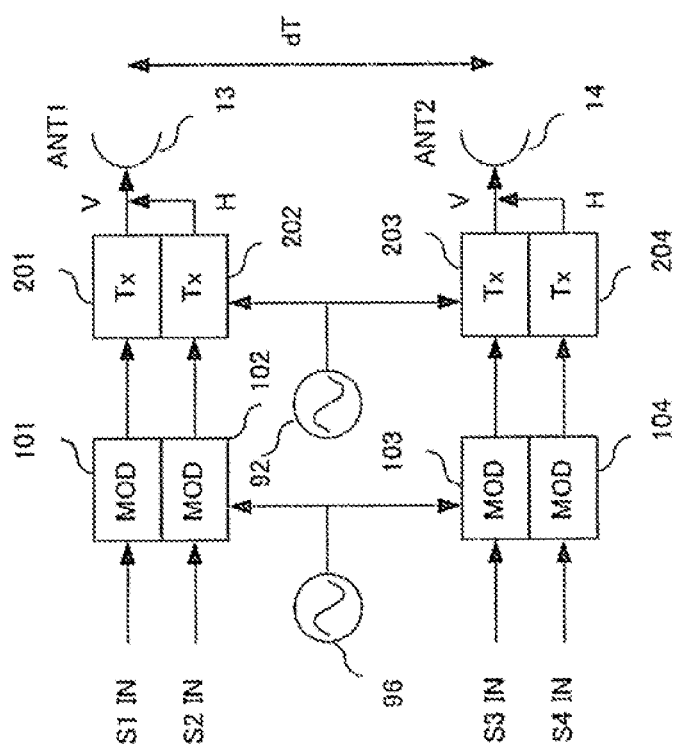
FIG. 3 A block diagram of the transmitting side of a wireless communication system according to examples 1 and 2 of the present invention.

FIG. 3 shows an example of configuration of the transmitting side of the communication system according to example 1.

The communication system shown in FIG. 3 includes the following components on the transmitting side: four transmitters (Tx) 201 to 204; four modulators (MOD) 101 to 104; two transmitting antennas (antenna 1 (ANT1) (hereinafter, referred to as "first transmitting antenna") and antenna 2 (ANT2) (hereinafter, referred to as "second transmitting antenna")) 13 and 14; an IF (Intermediate Frequency) local oscillator (IF LO) 96; and an RF (Radio Frequency) local oscillator (RF LO) 92.

As shown in FIG. 3, the transmission side transmits four BB (baseband) signals (S1 In to S4 In). For example, when constructing an STM-4 transmission apparatus as a whole, each BB signal is an STM-1 (155.52-Mbps) signal.

The modulators 101 to 104 input the respective BB signals, and periodically insert pilot signals thereto. The modulators 101 to 104 then frequency convert the signals into IF modulated signals (IF signals) through quadrature modulation by using an LO signal from the IF local oscillator 96, and output the resultant to the respective transmitters 201 to 204.

The transmitters 201 to 204 frequency convert the input IF signals into RF-band signals (RF signals) by using an IO signal from the RF local oscillator 92, amplify the RF signals to a transmission output level, and output the resultant to the first transmitting antenna (antenna 1: ANT1) 13 and the second transmitting antenna (antenna 2: ANT2) 14.

The local oscillator (IF LO) 96 between the modulators 101 to 104 and the local oscillator (RF LO) 92 between the transmitters 201 to 204 are synchronous in frequency but may have a difference in phase. The condition for synchronization on the clocks of the respective BB signals varies depending on the configuration of the demodulators. The condition will be described after the description of the demodulators later.

All the modulators 101 to 104 have the same IF frequency and all the transmitters 201 to 204 the same RF frequency (however, not synchronous). The four signals have the same transmission band. Two RF signals connected to an identical antenna are of different polarizations (typically referred to as V (Vertical) and H (Horizontal)). The distance dT between the two transmitting antennas 13 and 14 is sufficiently wider than the wavelength λ of the RF signals. The two transmitting, antennas 13 and 14 may be spaced either horizontally or vertically as long as the direction coincides with the direction of spacing of two receiving antennas on the receiving side to be described later. The wavelength λ of the RF signals is given by the following equation:

$$\lambda = c/f \qquad [\text{Eq. 2}]$$

In the foregoing equation, c is the velocity of light $3 \times 10^8$ (m/s) and f is the frequency (Hz) of the RF signals. The wavelength λ is in units of (m). For example, with an RF frequency of 30 GHz, the wavelength is approximately 0.01 m, or equivalently, 1 cm. The stationary MIMO system constructed by the principle of NPL 2 alone is impractical because of such a short wavelength. More specifically, the precondition for establishing MIMO transmission channels will not hold unless the entire system is maintained with millimeter precision. It is extremely difficult to set the installation spacing of the antennas with millimeter precision. Besides, antennas installed on antenna towers are changing in position slowly and slightly, but constantly in the wind and due to other factors. It is therefore impractical to fix the difference in phase between the reception signals ascribable to a difference in the channel length between the communication channels in units of mm.

The configurations of PTL 1 provide solutions to such a problem. PTL 1 shows various types of configurations, whereas the description here deals with the configuration of performing MIMO signal processing only on the receiving side. The same shall hold for the other configurations. The following description will be given on the assumption that the antenna distance dT on the transmitting side and the antenna distance dR on the receiving side are equal to each other. It is shown in PTL 1, however, that a MIMO system can be constructed even if the distances are not equal.

Assuming that the communication channels have V/H cross polarization interference, the signals transmitted from the foregoing respective transmitters 201 to 204 arrive at the receiving side each with the other three signals superposed thereon.

As described above, in the communication system according to example 1, dual polarization transmission is performed to transmit two independent signals from the two transmitting antennas 13 and 14 on the transmitting side to the two receiving antennas on the receiving side to be described later in the same band by using the V and H, two mutually orthogonal polarizations of radio waves as well as MIMO spatial multiplexing.

[Configuration of Receiving Side]

Figure 4:
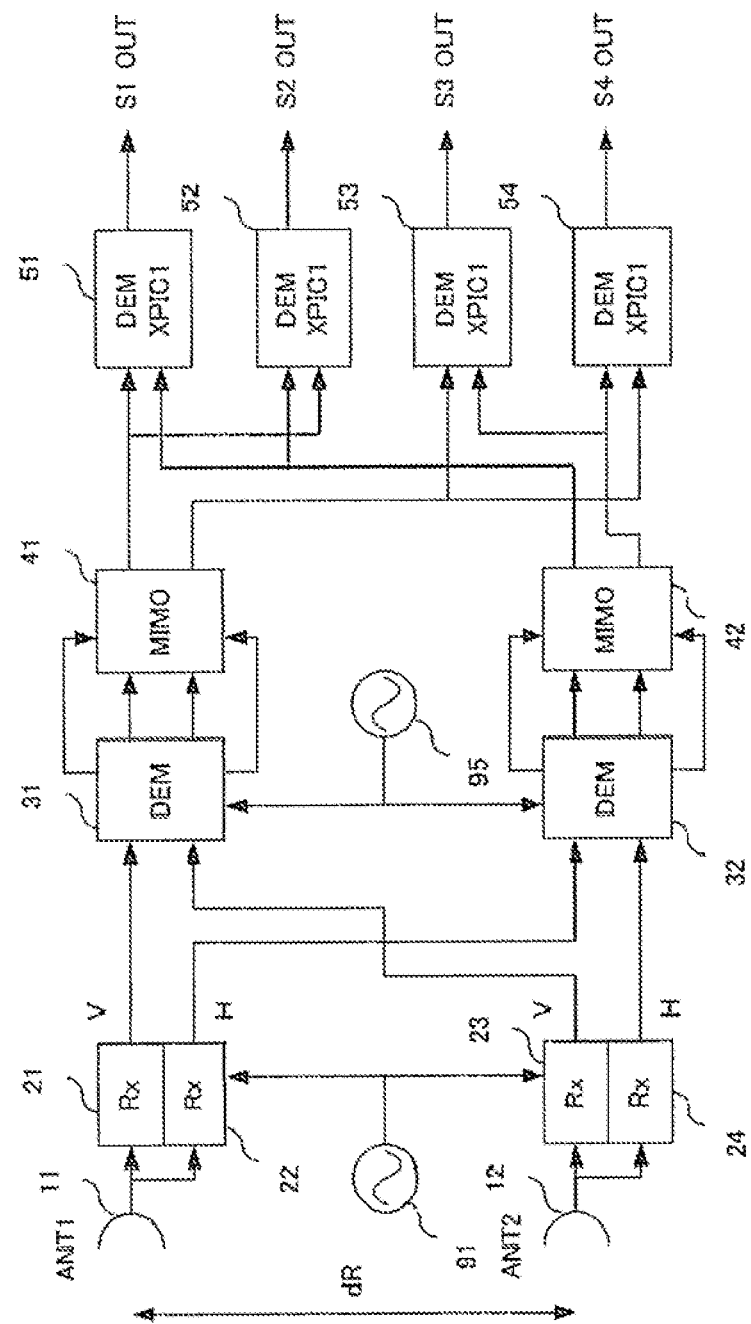
FIG. 4 A block diagram of the receiving side of the wireless communication system according to example 1 of the present invention.

FIG. 4 shows an example of configuration of the receiving side of the communication system according to example 1.

The communication system shown in FIG. 4 includes two receiving antennas (antenna 1 (ANT1) (hereinafter, referred to as "first receiving antenna") and antenna 2 (ANT2) (hereinafter, referred to as "second receiving antenna")) 11 and 12 on the receiving side. Four receivers (Rx) 21 to 24, two demodulators (DEM circuits) 31 and 32, two MIMO signal processing circuits 41 and 42, four interference canceling units (DEM XPIC1 circuits) 51 to 54, an RF local oscillator (RF LO) 91, and an IF local oscillator (IF LO) 95 are provided on the output side of the first and second receiving antennas 11 and 12.

The first receiving antenna 11 and the second receiving antenna 12 are installed at a distance dR from each other.

Of the four receivers 21 to 24, the two receives 21 and 22 connected to the first receiving antenna 11 separate the RF signal received by the first receiving antenna 11 into a V-polarized signal and an H-polarized signal. The receivers 21 and 22 frequency convert the respective separated signals into IF signals by using an LO signal supplied from the RF local oscillator 91, and output the respective converted IF signals to the demodulator 31 for V polarization and the demodulator 32 for H polarization, respectively. Such an operation is also performed by the two receivers 23 and 24 that are connected to the second receiving antenna 12 among the four receivers 21 to 24. The polarization-based separation is not perfect but produces mutual interference components. The interference components are therefore not zero even if no cross polarization interference occurs in the communication channels. The same holds for the transmitting antennas. The ratio between the power of a signal that is originally desired to receive (Desire) and that of an interfering signal of different polarization (Undesire) will be referred to as D/U (Desire to Undesire power ratio).

By the foregoing operation, the signals of the same polarizations among the outputs of the four receivers 21 to 24 are input to the respective demodulators (DEM circuits) 31 and 32.

FIG. 5 shows an example of the internal configuration of the DEM circuits 31 and 32.

As shown in FIG. 5, a DEM circuit includes two demodulation circuits (Q(Quadrature)-DEM circuits) 301 and 302, two A/D converters 303 and 304, and two correlators (CORR) 305 and 306.

The Q-DEM circuits 301 and 302 orthogonally demodulate the respective IF signals (S1 In, S2 In) by using the same or asynchronous LO signal (IF LO) supplied from the IF local oscillator 95, frequency convert the resultant into two BB signals, and output the BB signals to the A/D converters 303 and 304, respectively.

The A/D converters 303 and 304 convert the two frequency-converted BB signals into respective digital signals, and output the digital signals (S1 Out, S2 Out) to the correlators 305 and 306 and the MIMO signal processing circuits 41 and 42, respectively. The LO frequency at this stage typically need not be synchronous with the carrier frequency of the reception signals. The difference in frequency is corrected by a carrier recovery circuit in a subsequent stage (semi-synchronous detection).

The correlators 305 and 306 extract signal portions corresponding to pilot signals (to be described later) from the respective two A/D converted digital signals. The correlators 305 and 306 perform a correlation calculation with the pilot signals applied to the signals to demodulate, thereby determining the elements of the communication channel matrix H to obtain phase difference information. The elements of the communication channel matrix H determined by such a correlation calculation will be used as coefficients (C1 Out to C4 Out) in the MIMO signal processing circuits 41 and 42.

Figure 6:
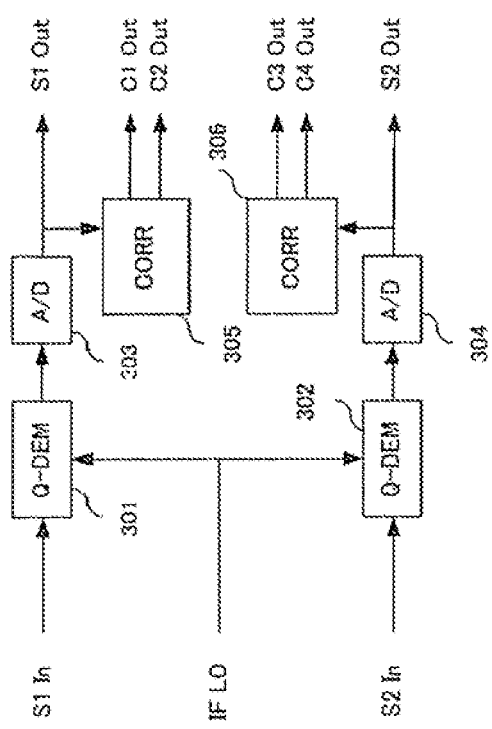
FIG. 6 A block diagram of a MIMO signal processing circuit of FIG. 4.

FIG. 6 shows an example of the internal configuration of the MIMO signal processing circuits 41 and 42.

The MIMO signal processing circuit shown in FIG. 6 is composed of a complex multiplier circuit (multipliers 401 to 404 and adders 405 and 406). With such a circuit configuration, the MIMO signal processing circuit performs a matrix operation on the coefficients (C1 to C4) supplied from the correlators 305 and 306 of the DEM circuit and the input signals (S1 In, S2 In) corresponding to the outputs of the DEM circuit. This operation demultiplexes the two spatially-multiplexed signals (S1 Out, S2 Out) while removing the effect of variable factors on the MIMO condition that make no temporal variation or only extremely slow variations such as an error in the installation spacing of the antennas and variations of the antenna positions in the wind.

It should be noted that the elements of the communication channel matrix H determined from the pilot signals originally consist of both amplitudes and phases. It is only the phases that need to be taken into account, however, since the communication channels have almost the same channel lengths, and the amplitudes have only an extremely small difference and can be regarded as relatively the same. This point is also mentioned in NPL 2. The pilot signals have a known fixed pattern that is determined in advance. The amounts of deviation of the periodically-received pilot signals from the original pattern can be calculated to obtain the elements (information) of the communication channel matrix H on the receiving side. The coefficients (C1 to C4) of the MIMO signal processing circuits 41 and 42 are determined from the elements of the communication channel matrix H.

The two outputs (S1 Out, S2 Out) of each of the MIMO signal processing circuits 41 and 42 are signals that are transmitted with the same polarization and received by different receiving antennas. The same processing is performed on both V polarization and H polarization. Of the four outputs from the two MIMO signal processing circuits 41 and 42, the signals received by the same receiving antennas are input together to the interference canceling units (DEM XPIC1 circuits) 51 to 54.

Figure 7:
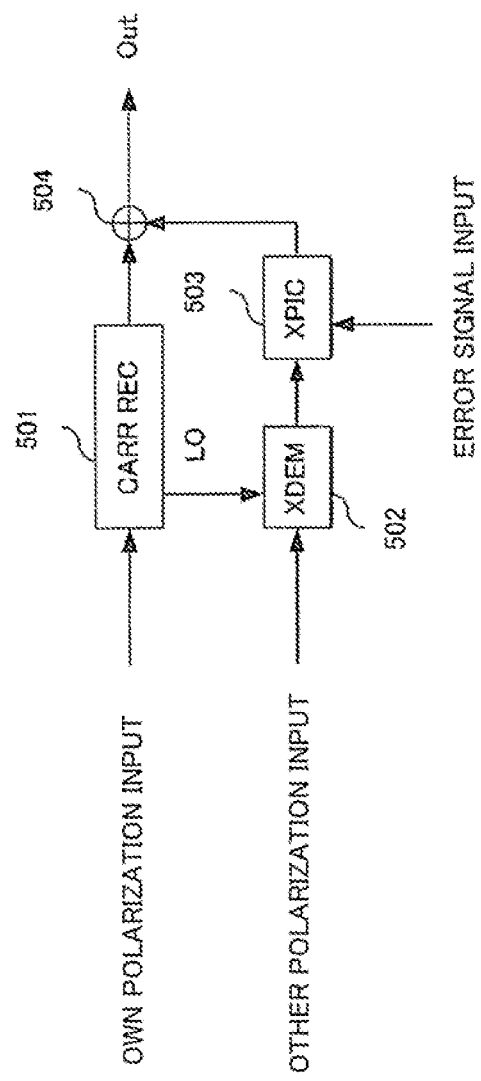
FIG. 7 A block diagram of an interference canceller (DEM XPIC1) of FIG. 4.

FIG. 7 shows an example of the internal configuration of the DEM XPIC1 circuits 51 to 54.

The DEM XPIC1 circuit shown in FIG. 7 includes a carrier recovery circuit (CARR REC) 501, a XDEM circuit 502, a XPIC circuit (corresponding to an interference canceller of the present invention) 503, and an adder 504. The carrier recovery circuit 501 completely eliminates a carrier phase rotation remaining in the own signal to demodulate (own polarization input). The XDEM circuit 502 receives a digital LO signal (sin and cos) generated by the carrier recovery circuit 501, and uses the LO signal to give a carrier phase rotation to the signal of the other polarization that is input as a reference signal for interference cancellation (other polarization input). The XPIC circuit 503 correlates an error signal obtained from the own signal demodulated and the output signal of the XDEM circuit 502 to create a replica of the interference component. The adder 504 subtracts the replica of the interference component from the own signal interfered.

Figure 8:
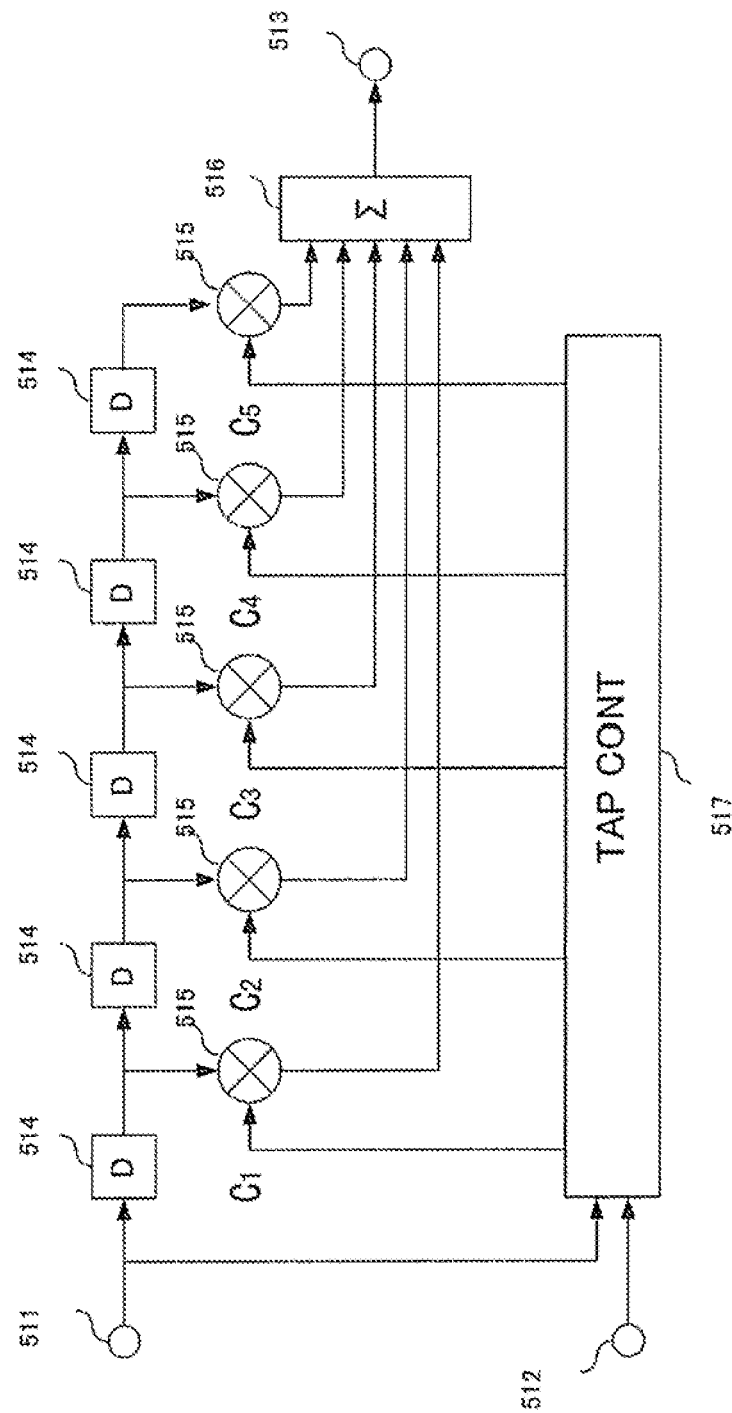
FIG. 8 A block diagram of the XPIC circuit of FIG. 7.

FIG. 8 shows an example of the internal configuration of the XPIC circuit 503.

The XPIC circuit 503 shown in FIG. 8 includes an FIR (Finite Impulse Response) filter (composed of shift registers 514, multipliers 515, and an adder 516), and a tap control circuit 517.

The tap control circuit 517 correlates a XPIC input signal 511 corresponding to each tap of the FIR filter and an error signal 512, and integrates the result to generate tap coefficients C1 to C5 automatically. The output 513 of the XPIC circuit 503, or replica, is eventually subtracted from the own signal interfered for interference elimination.

The purpose of the phase rotation the XDEM circuit 502 gives to the signal of the other polarization is so that the relationship between the carrier frequencies of the V and H signals upon the occurrence of interference between the transmitting and receiving receivers is input into the XPIC circuit 503 intact. In other words, all the RF and IF LO frequencies on the receiving side are synchronized between V and H so that the XPICs can maintain the BB signals to the phase relationship at the point of occurrence of interference regardless of a difference between the V and H carrier frequencies on the transmitting side. As a result, the XPIC circuit 503 can extract the interference component. Since the principle of operation of the XPIC is already known widely, no further description will be given here. If the RF LOs of V and H polarizations on the receiving side are asynchronous, a circuit for canceling the frequency difference needs to be interposed in some stage before the addition with the own polarization signal. That is, in any case, the LOs on the receiving side eventually need to be synchronous in frequency. The XPICs in the demodulator of the other polarization make exactly the same operation except that V and H change places.

Consequently, even if the cross polarization interference components vary with time, the interference canceling units (DEM XPIC1 circuits) 51 to 54 cancel the cross polarization interference components by an adaptive control of changing the replicas of the interference components accordingly.

The interference canceling units (DEM XPIC1 circuits) 51 to 54 shown in FIG. 4 thereby output signals of high quality (S1 Out to S4 Out) that are given spatial demultiplexing and cross polarization interference cancellation.

As described above, example 1 of FIG. 4 initially performs spatial demultiplexing in the MIMO signal processing circuits 41 and 42, and then performs cross polarization interference cancellation in the interference canceling units (DEM XPIC1 circuits) 51 to 54. This is different from the parallel signal processing shown in FIG. 2. The reason for the normal functioning of such a configuration will be described below.

In the absence of cross polarization interference, spatial demultiplexing is performed in the MIMO signal processing circuits as described in PTL 1, and no description thereof will be given in particular. An only difference from PTL 1 is the presence of cross polarization interference. In order to discuss the effect of cross polarization interference on spatial demultiplexing, description will first be given of how cross polarization interference occurs. Cross polarization interference occurs from deviations of the planes of polarization due to raindrops when the communication channels are under rainfall, and deterioration of antenna XPD (Cross Polarization Discrimination). Two signals of the same polarization transmitted from different antennas are received through exactly the same channels regardless of whether there are such factors for cross polarization interference or not at all.

The spatial multiplexing according to the present invention is based on a difference in phase between two signals due to a difference in the channel length between the signals. Given exactly the same channel lengths, the spatial multiplexing therefore will not be affected by the independence of the communication channels. Consequently, cross polarization interference has no effect on the MIMO signal processing. That is, spatial demultiplexing can be performed through the MIMO signal processing, ignoring cross polarization interference. In the presence of cross polarization interference, spatial demultiplexing is performed with the interference intact. The spatial demultiplexing processing will not increase or decrease the amount of cross polarization interference, nor will the presence or absence of cross polarization interference affect the accuracy of the spatial demultiplexing. This will be mathematically shown later.

After the completion of the spatial demultiplexing, there are only four types of signals with ordinary cross polarization interference. In other words, there are only two independent pairs of ordinary dual polarization transmission, and the interference can be cancelled by XPICs.

Consequently, as in example 1 of FIG. 4, demodulation can be properly performed by time-series processing of initially performing spatial demultiplexing and then performing cross polarization interference cancellation.

[Description of Pilot Signals]

Initially, description will be given of a typical pilot signal.

A pilot signal is a signal of fixed pattern which is periodically inserted into a series of signals to be transmitted in order to obtain information on the communication channel matrix H on the receiving side. Specifically, the pilot signal is composed of a certain number of QPSK (Quadrature Phase Shift Keying) transmission symbols. Transmitting a signal known to the transmitting and receiving sides makes it possible to grasp the effect of the communication channels from the reception signals. Even with multilevel QAM demodulators, the pilot signal portions are transmitted in QPSK since the signal points of the pilot signal fall on QPSK-equivalent coordinates.

In the case of the spatial multiplexing system shown in PTL 1 with two transmitting antennas and two receiving antennas, mutually orthogonal pilot signals are assigned to the signals that are transmitted from the respective antennas.

Two patterns are referred to as being orthogonal when the coordinates of the respective corresponding transmitted symbols are multiplied by each other and the multiplications for the total number of symbols add up to 0. That is, the following equation holds:

$$\sum_{i=1}^{n} p1(i) \cdot p2(i) = 0 \qquad \text{[Eq. 3]}$$

where p1(i) and p2(i) are the two orthogonal pilot signals (the coordinates of the transmitted symbols in complex representations), and n is the number of symbols.

On the receiving side, the elements of the communication channel matrix H can be determined by the following correlation calculations:

$$h_{11} = \sum_{i=1}^{n} r1(i) \cdot p1(i)$$ [Eq. 4]

$$h_{12} = \sum_{i=1}^{n} r2(i) \cdot p1(i)$$

$$h_{21} = \sum_{i=1}^{n} r1(i) \cdot p2(i)$$

$$h_{22} = \sum_{i=1}^{n} r2(i) \cdot p2(i)$$

In the foregoing equations, r1(i) is the received signal of the first receiving antenna at the timing of transmission of the pilot signal. Similarly, r2(i) is the received signal of the second receiving antenna. If the two transmitting antennas, and the two receiving antennas, are sufficiently spaced apart from each other, the signal transmitted from the first transmitting antenna will not reach the second receiving antenna on the receiving side, and vice versa. In such a case, $h_{12}$ and $h_{21}$ are 0. This corresponds to a situation where there are two completely independent communication channels. If the two antennas are close to each other, the reception levels at the other antennas increase, so that $h_{12}$ and $h_{21}$ have some values.

On the other hand, in a system with cross polarization multiplexing but no spatial multiplexing, it is possible to create a replica of the interference component by correlating a received signal and an interfering signal. No pilot signal will thus be used.

Next, the method of application of pilot signals according to the present invention will be described. This provides an explanation on how the information on the communication channel matrix H can be correctly extracted by using pilot signals despite cross polarization interference.

Example 1 of the present invention involves four signals, polarized and spatial. The four signals are subjected to respective different pilot signals p1 to p4 that are orthogonal to each other. Here, the pilot signal p1 is applied to a V-polarized wave $V_1$ which is transmitted from the first transmitting antenna, p2 an H-polarized wave $H_1$ transmitted from the first transmitting antenna, p3 a V-polarized wave $V_2$ transmitted from the second transmitting antenna, and p4 an H-polarized wave $H_2$ transmitted from the second transmitting antenna.

For example, when a superposed received signal of the four signals $V_1$, $H_1$, $V_2$, and $H_2$ is correlated with the pilot signal p1 on the receiving side, the resulting correlation value only contains phase difference information on the V-polarized signal $V_1$ since the pilot signal p1 and the other pilot signals p2 to p4 are orthogonal to each other. The same holds for the rest, and it is possible to obtain only the phase difference information on a signal desired to demodulate.

The V-polarized signals are collected to the modulator 31 of FIG. 4. Correlations are calculated between the V-polarized signal $V_1$ received by the first receiving antenna 11 and the pilot signal p1, and between the V-polarized signal $V_2$ received by the second receiving antenna 12 and the pilot signal p3. The correlation coefficients determined by the two correlation calculations are supplied to the MIMO signal processing circuit 41, whereby the spatially multiplexed signals are demultiplexed. Here, cross polarization interferences have no effect on the orthogonality of the signals, and remain unchanged through the MIMO signal processing circuit 41. The same holds for the H-polarized signals. The two H-polarized signals $H_1$ and $H_2$ input to the demodulator 32 and the pilot signals p2 and p4 are correlated, and the resulting coefficients are used for spatial demultiplexing of the H-polarized waves.

For the precondition on cross polarization interference, D/U shall range from ∞ (no interference) to 1 (0 dB) at minimum. Such a condition ensures that the phase information obtained from the correlation calculations between the signals to demodulate and the pilot signals is on the signals to demodulate.

[Relationship Between LO Frequency and Phase in the Present Invention]

As shown in FIG. 3, the transmitting side includes the local oscillators (LO) 96 and 92 in the IF stage and RF stage, respectively. In an ordinary dual polarization transmission system without MIMO, neither of the local oscillators provides synchronization between V and H. As shown in FIG. 4, the receiving side also includes the local oscillators (LO) 91 and 95 in the IF stage and RF stage. In an ordinary dual polarization transmission system, both the local oscillators need to provide synchronization between V and H for the sake of the XPIC function. In practice, the same IF LO signal is used for the frequency conversion from the IF signals into the BB signals. In PTL 1, the LO signals for the respective antennas are asynchronous with each other. In example 1, the LO signals on the transmitting side may have a difference in phase but are synchronous in frequency. The LO signals on the receiving side are also synchronous with each other.

In the following description, $S_1$ refers to the sum of the V-polarized signal $V_1$ and the H-polarized signal $H_1$ to be transmitted from the first transmitting antenna 13. $S_2$ refers to the sum of the V-polarized signal $V_2$ and the H-polarized signal $H_2$ to be transmitted from the second transmitting antenna 14. The spatially multiplexed signal received by the first receiving antenna 11 will be referred to as $R_1$. The spatially multiplexed signal received by the second receiving antenna 12 will be referred to as $R_2$. Moreover, the first V-polarized signal output from the MIMO signal processing circuit 41 will be referred to as $Y_1$, and the second V-polarized signal will be referred to as $Y_2$.

Then, the coefficients of the MIMO signal processing circuit 41 calculated from the pilot signals p1 and p3 are given by the following equation.

The demodulator 31 for V polarization performs a correlation calculation between the pilot signals p1 and p3 for V polarization. This allows phase detection irrespective of spatial multiplexing and cross polarization interference. The coefficients calculated coincide with those shown in PTL 1 (ignoring the amplitude coefficient 1/√2), so that the MIMO signal processing is shown by the following calculation:

$$\begin{pmatrix} Y_1 \\ Y_2 \end{pmatrix} = \begin{pmatrix} 1 & j \\ j \cdot e^{-j\theta 2} & e^{-j\theta 2} \end{pmatrix} \begin{pmatrix} R_1 \\ R_2 \end{pmatrix}$$ [Eq. 5]

Assuming here that α and β are the amplitude ratios equivalent to D/U (D/U=∞ when α=0, and D/U=0 dB when α=1; the same holds for β), $S_1$ and $S_2$ are expressed by the following equations. The phases of $H_1$, $V_2$, and $H_2$ with reference to that of $V_1$ will be denoted by θ1, θ2, and θ3, respectively. Such phases shall cover differences in phase between the LO signals as well as differences in phase that are ascribable to differences in the channel length because of deviated antenna positions. If the antenna positions have no deviation, $S_2$ arrives at the first receiving antenna after $S_1$ with a delay of π/2. Similarly, $S_1$ arrives at the second receiving antenna after $S_2$ with a delay of $\pi/2$. The outputs of the MIMO signal processing circuit 41 are therefore as follows:

$$\begin{aligned}
S_1 &= V_1 + \alpha H_1 \cdot e^{j\theta 1} \quad &&\text{[Eq. 6]}\\
S_2 &= V_2 \cdot e^{j\theta 2} + \beta H_2 \cdot e^{j\theta 3}\\
R_1 &= S_1 - jS_2\\
R_2 &= S_2 - jS_1\\
Y_1 &= R_1 + jR_2\\
&= S_1 - j \cdot S_2 + j(S_2 - jS_1)\\
&= V_1(1+1) + \alpha H_1 \cdot e^{j\theta 1}(1+1) - jV_2 \cdot e^{j\theta 2}(1-1) -\\
&\quad j\beta H_2 \cdot e^{j\theta 3}(1-1)\\
&= 2(V_1 + \alpha H_1 \cdot e^{j\theta 1})\\
Y_2 &= R_2 \cdot e^{-j\theta 2} + jR_1 \cdot e^{-j\theta 2}\\
&= (S_2 - jS_1) \cdot e^{-j\theta 2} + j(S_1 - jS_2) \cdot e^{-j\theta 2}\\
&= V_2 \cdot e^{j\theta 2} \cdot e^{-j\theta 2}(1+1) + \beta H_2 \cdot e^{j\theta 3} \cdot e^{-j\theta 2}(1+1) -\\
&\quad jV_1 \cdot \theta^{-j\theta 2}(1-1) - j\alpha H_1 \cdot e^{j\theta 1} \cdot e^{-j\theta 2}(1-1)\\
&= 2(V_2 + \beta H_2 \cdot e^{j(\theta 2 - \theta 2)})
\end{aligned}$$

The foregoing equations show that the MIMO signal processing circuit 41 outputs the V-polarized signal $V_1$ received at the first receiving antenna 11 and the V-polarized signal $V_2$ at the second receiving antenna 12, both of which contain a cross polarization interference.

The demodulator 32 for H polarization similarly performs a correlation calculation between the pilot signals p2 and p4 for H polarization. As a result, the MIMO signal processing circuit 42 outputs the H-polarized signal $H_1$ received at the first receiving antenna 11 and the H-polarized signal $H_2$ at the second receiving antenna 12, both of which contain a cross polarization interference.

That is, the selection of mutually orthogonal patterns for the pilot signals to be inserted into the four signals makes it possible to extract phase information intended for spatial demultiplexing regardless of the degree of cross polarization interference. The phase information can be used to perform spatial demultiplexing normally, so that the MIMO signal processing circuits 41 and 42 make outputs with the cross polarization interference components intact.

In other words, the pilot signals to be periodically inserted into the series of transmission signals in order to obtain information on the communication channel matrix are preferably series of mutually orthogonal signals regardless of whether the signals are ones to be transmitted from different antennas or ones of different polarizations to be transmitted from the same antenna.

The foregoing description has been given on the assumption that the LOs on the transmitting side are synchronous in frequency. In fact, there is a difference in frequency if a difference in phase varies with time. The foregoing equations show that the presence of such a difference in frequency is allowable. That is, despite a difference in frequency, the orthogonal spatial multiplexing communication channels can be maintained if the resulting difference in phase can be detected correctly. The range of detection of the difference in phase depends on the ratio of the pilot signals to the entire signals and the signal speed. With a greater number of pilot signals or with apparatuses that transmit high speed signals, the allowable range of the difference in frequency increases. Since the IF LOs are low in frequency, the difference in frequency is so small that the IF LOs need not be synchronized in practical use. Depending on the condition for circuit implementation, different LOs are used in an asynchronous fashion, and the same LO in a synchronous fashion. The same holds for the RF LOs; frequency synchronization is not needed if the difference in frequency is sufficiently small.

As has been described above, according to the present example, there are provided the following effects.

A first effect is that the independent, time-series execution of the two signal operations (MIMO and XPIC) eliminates the need for operations that involve an unnecessarily large number of signals. This allows a simple circuit configuration.

A second effect is that both the signal operations are linear processing, and provide the same result regardless of which is performed first. It is therefore possible to select a circuit configuration suited to the implementation of the apparatuses.

A third effect is that the stability of the demodulation operations is ensured since it is theoretically supported that the two signal operations can be performed independently. This is shown by the foregoing equations ([Eq. 3] to [Eq. 6]). More specifically, the MIMO spatial multiplexing according to the present example is based on a difference in phase between two signals due to a difference in the channel length between the signals. Given exactly the same channel lengths, the spatial multiplexing therefore will not be affected by the independence of the communication channels at all. Cross polarization interference thus has no effect on the MIMO signal processing, and it is possible to perform spatial demultiplexing by the MIMO signal processing, ignoring the cross polarization interference. That is, in the presence of cross polarization interference, the spatial demultiplexing is performed with the interference intact. The spatial demultiplexing processing will not increase or decrease the amount of cross polarization interference, nor will the presence or absence of cross polarization interference affect the accuracy of the spatial demultiplexing.

A fourth effect derives from the combination of MIMO and dual polarization transmission itself. While arrays of four antennas are needed to quadruple the transmission capacity by using MIMO alone, the combination of MIMO and dual polarization transmission entails arrays of only two antennas, which means high cost efficiency. While the combination of bandwidth expansion and dual polarization transmission causes a drop in the system gain for the sake of bandwidth expansion, the combination of MIMO and dual polarization transmission without a bandwidth expansion will not lower the system gain.

Example 2

Next, a communication system according to example 2 of the present invention will be described with reference to FIGS. 9 and 10.

As can be seen from FIGS. 6 and 8 above, the MIMO signal processing and the XPIC signal processing both are linear operations. That is, the same result is obtained regardless of which is processed first. In the configuration of the receiving side of example 2, the XPICs are arranged prior to the MIMO signal processing circuits in an order inverse to example 1.

Figure 9:
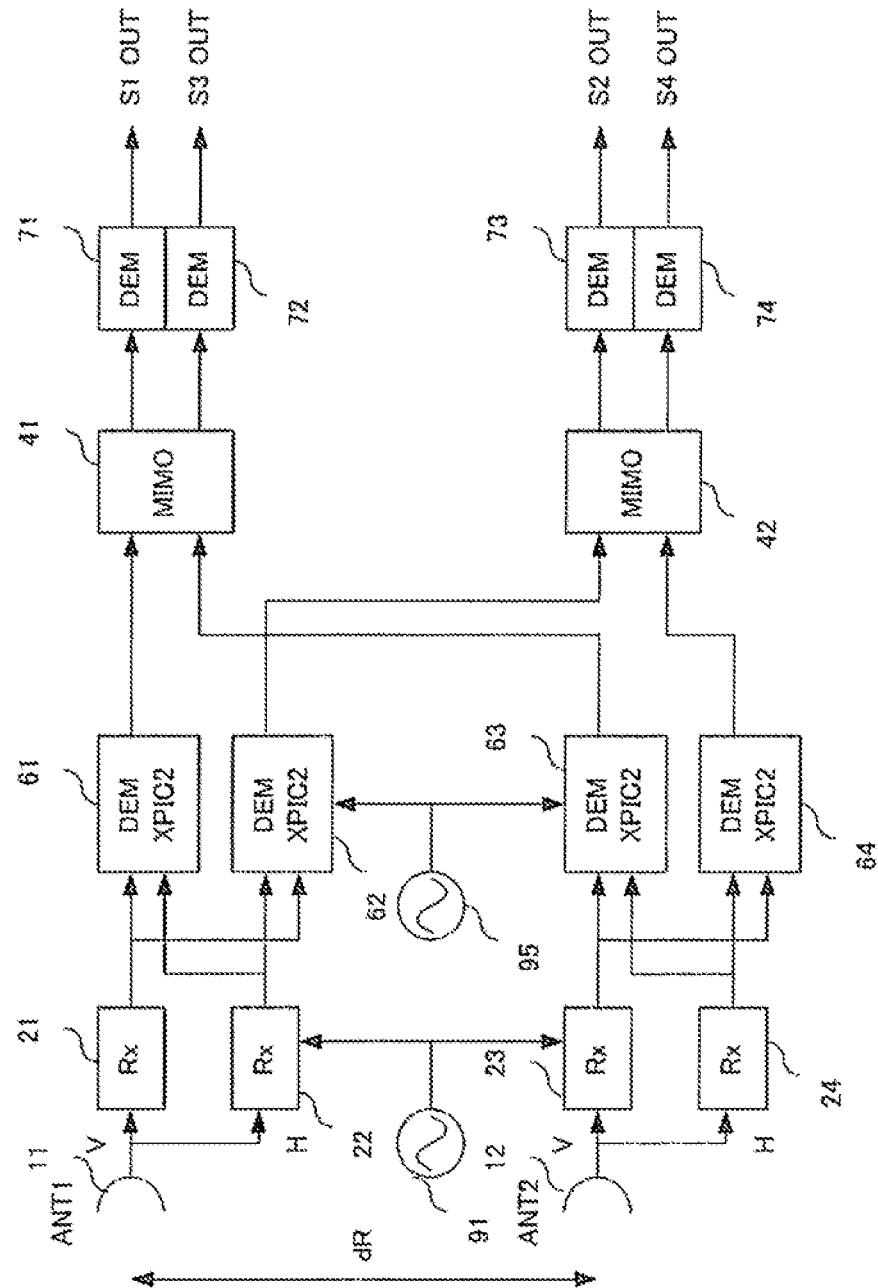
FIG. 9 A block diagram of the receiving side of the wireless communication system according to example 2 of the present invention.

FIG. 9 shows an example of configuration of the receiving side of the communication system according to example 2.

The receiving side of the communication system shown in FIG. 9 are almost the same components as in FIG. 4. Detailed description thereof will thus be omitted. As shown in FIG. 9, first and second antennas 11 and 12 are connected with receivers 21 to 24 for V-polarized signals and H-polarized signals, on the output side of which respective four interference canceling units (DEM XPIC2 circuits) 61 to 64 are arranged. Two MIMO signal processing circuits 41 and 42 are provided in the subsequent stage, and four DEM circuits 71 to 74 are provided in the subsequent stage.

Figure 10:
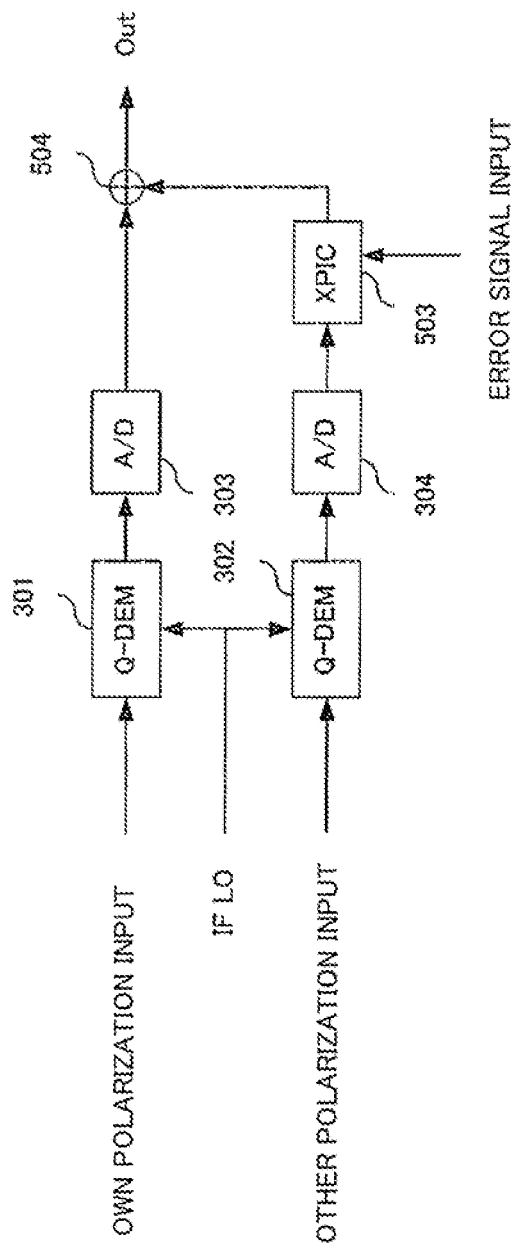
FIG. 10 A block diagram of an interference canceller (DEM XPIC2) of FIG. 9.

FIG. 10 shows an example of the internal configuration of the DEM XPIC2 circuits 61 to 64.

The DEM XPIC2 circuit shown in FIG. 10 includes the two demodulation circuits (Q-DEM circuits) 301 and 302 and the A/D converters 303 and 304 of the DEM circuit shown in FIG. 5 seen above, and the XPIC circuit (corresponding to an interference canceller of the present invention) 503 and the adder 504 of the DEM XPIC1 circuit shown in FIG. 7 seen above. As compared to the configuration of example 1, the position of execution of the A/D conversion comes before the demodulation operation. This means no substantial difference except in the combination of the A/D converter and the other functions.

Cross polarization interference can be cancelled as long as the interference components can be extracted, regardless of whether the source signals are spatially multiplexed or not. If error signals can be generated from the output signals of the DEM XPIC2 circuits 61 to 64, the error signals and the input signal of the XPIC circuit 503 can be correlated to create an interference replica in the spatially multiplexed form. That is, it is possible to ignore the spatial multiplexing while performing the XPIC-based interference cancellation. The XPIC processing will not change the orthogonality of the spatial multiplexed communication channels, nor will the spatial multiplexing affect the accuracy of the XPIC-based interference cancellation. After the completion of the interference cancellation, there are only two signals with ordinary spatial multiplexing, which can be demultiplexed by the MIMO signal processing circuits 41 and 42.

As in example 2 of FIG. 9, demodulation can thus be properly performed in time-series processing of initially performing cross polarization interference cancellation and then performing spatial demultiplexing. In the case of example 2, the XPICs first come into operation on the receiving side for interference cancellation, followed by the detection of pilot signals. Cross polarization interference evidently has no effect on the extraction of information on the communication channel matrix.

[Clock Synchronization]

Since the pilot signals need to be observed at the same timing and the A/D converted signals need to be used in all the circuits, the four series of transmitting signals need to be synchronous in clock.

In example 2, signals of different polarizations are initially separated, which entails clock synchronization polarization by polarization. For proper operation, the transmitting side has only to synchronize the clocks of the respective same polarizations.

Other Examples

The foregoing description has dealt with the case of the highest cost efficiency with two transmitting antennas and two receiving antennas. The configuration of the present invention can be applied, however, to even three-antenna configuration or four-antenna configuration with no substantial difference (see example 5 to be described later). This can increase the transmission capacity in proportion to the number of antennas. How many antennas to use depends on a judgment on cost efficiency. Spatial multiplexing with polyhedral antennas is described in PTL 1.

So far the description has been given on the basis of semi-synchronous demodulation for practical use. It should be understood, however, that the present invention is also applicable to synchronous detection demodulators. In such a case, both examples 1 and 2 use synchronous LO signals for the DEM circuits in the first stage. The control signal (APC signal) is generated from the error signals that are obtained from the result of demodulation in the final stage. This eliminates the need for the carrier synchronizing circuits in a subsequent stage.

The description has also dealt with the case where the section for converting the IF signals into the BB signals is composed of analog orthogonal demodulation circuits. However, the section may be implemented by A/D conversion and digital orthogonal demodulation circuits. Alternatively, frequency conversion by analog multipliers may be followed by the A/D conversion and the digital orthogonal demodulation circuits. The section may have any circuit configuration without any substantial impact on the effects of the present invention. An optimum configuration can be selected depending on the signal speed, the IF frequency, etc.

In the present invention, the number of modulation levels is not limited in particular. QPSK may be used to provide a system of high system gain with a large capacity (although the capacity is naturally smaller than that of 128-QAM). On the other hand, if the cost does not matter, super multilevel modulation methods of 256-QAM and higher may be used to maximize the capacity.

Since the MIMO spatial multiplexing and the cross polarization interference during dual polarization transmission can be handled independently, the MIMO signal processing circuits in the transmitting set and receiving set of the present invention can be implemented to include all the configurations of PTL 1 (configuration examples 1 to 7). Hereinafter, such examples will be described with reference to FIGS. 11 to 16.

Example 3

Figure 11:
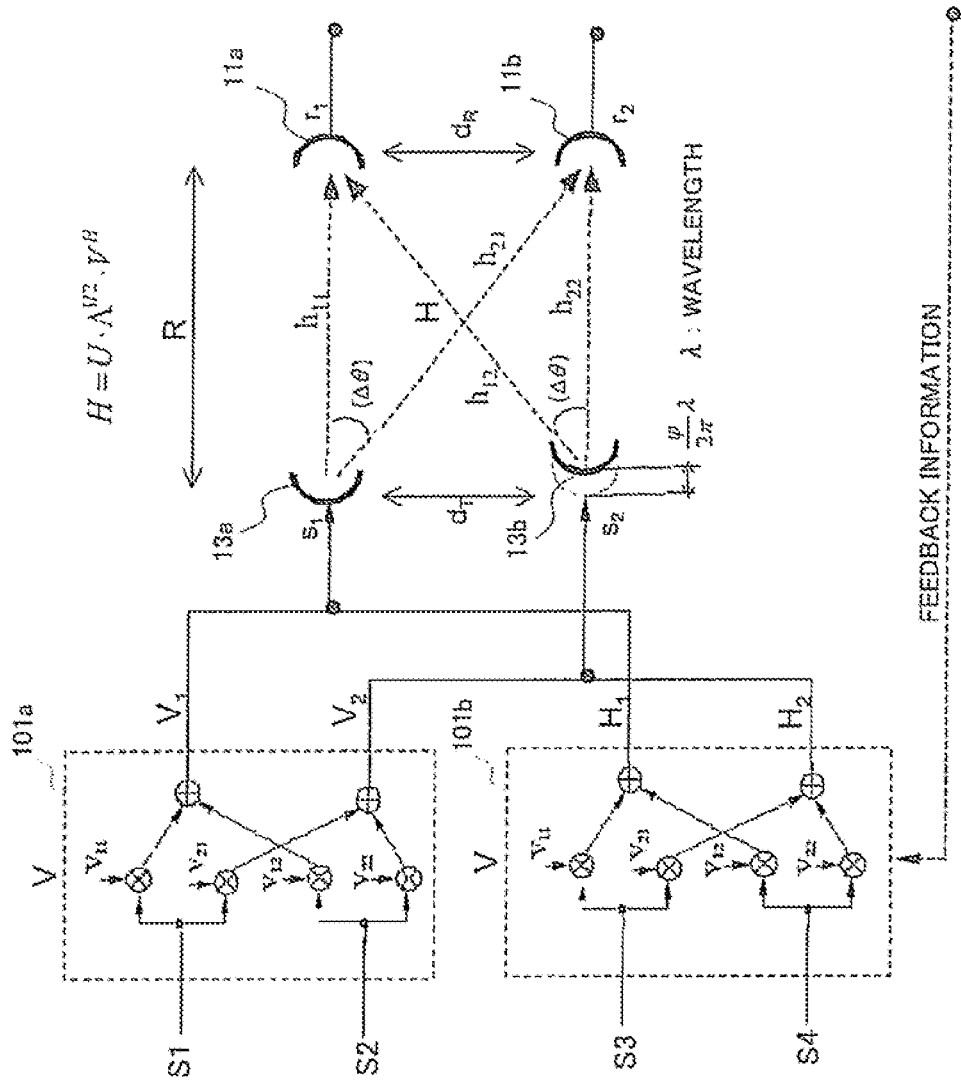
FIG. 11 A block diagram of the transmitting side of a wireless communication system according to example 3 of the present invention.

FIG. 11 shows the configuration of the transmitting side (transmitting section) of a wireless communication system according to example 3 of the present invention. In the example of FIG. 11, the configuration of the transmitting side of the wireless communication system according to example 1 shown in FIG. 3 is applied to the transmitting side of configuration examples 1 and 2 described in PTL 1 (where the unitary matrix of the communication channel matrix H is calculated on the transmitting side).

As with the configuration of FIG. 3 (example 1) seen above, the wireless communication system shown in FIG. 11 is a MIMO system (line-of-sight communication system) that has two transmitting antennas 13a and 13b on the transmitting side and two receiving antennas 11a and 11b on the receiving side, and forms mutually orthogonal fixed transmission channels between the transmitting side and the receiving side.

In FIG. 11, dT represents the installation distance (element distance) between the two transmitting antennas 13a and 13b, dR the installation distance (element distance) between the two receiving antennas 11a and 11b, R the transmission-reception distance of the transmission channels, and $\Delta\theta$ the angle of a diagonal path to a counter transmission channel between the transmitting and receiving antennas. $\lambda$ represents the wavelength of the RF signals to be transmitted, and $\phi$ the phase shift of the RF signal of the second transmitting antenna 13b due to a change in the antenna position.

In the wireless communication system shown in FIG. 11, the communication channel matrix H (composed of the four elements $h_{11}$, $h_{12}$, $h_{21}$, and $h_{22}$ mentioned above) of the communication channels between the transmitting side and the receiving side is expressed as $H=U\cdot\Lambda^{1/2}\cdot V^H$ after the application of a SVD (Singular Value Decomposition) matrix operation in MIMO. Here, V is the unitary matrix used in the matrix operation on the transmitting side ($V^H$ is the Hermitian transpose of the matrix V), U is the unitary matrix used in the matrix operation on the receiving side, and $\Lambda^{1/2}$ is a singular orthogonal matrix. For the matrix operation with the unitary matrix V on the transmitting side, feedback information for constructing the unitary matrix is passed from the receiving side to the transmitting side.

The transmitting section of the MIMO system shown in FIG. 11 inputs four BB signals S1 to S4, and performs MIMO spatial multiplexing as well as dual polarization transmission of transmitting two independent signals in the same band by using two mutually orthogonal polarizations V and H of radio waves as two signals $s_1$ and $s_2$ to be transmitted from the two antennas 13a and 13b on the transmitting side. The transmitting section includes a modulator 101a for V-polarized waves and a modulator 101b for H-polarized waves. The two modulators 101a and 101b correspond to the modulators 101 and 102 for V-polarized waves and the modulators 103 and 104 for H-polarized waves shown in FIG. 3, respectively. The modulators 101a and 101b are each composed of a complex multiplier circuit (four multipliers that use the four elements $V_{11}$, $V_{12}$, $V_{21}$, and $V_{22}$ of the unitary matrix V as their coefficients, and two adders that add the multiplied signals).

The modulator 101a for V-polarized waves performs MIMO spatial multiplexing signal processing of inputting the two BB signals S1 and S2 to the multipliers in parallel; multiplying the signals by the four elements $V_{11}$, $V_{12}$, $V_{21}$, and $V_{22}$ of the unitary matrix V, respectively; adding the multiplied signal of S1 and $V_{11}$ and the multiplied signal of S2 and $V_{21}$ into a V-polarized signal $V_1$; and adding the multiplied signal of S1 and $V_{12}$ and the multiplied signal of S2 and $V_{22}$ into a V-polarized signal $V_2$. The V-polarized signals $V_1$ and $V_2$ obtained by the signal processing are sent to the first and second transmitting antennas 13a and 13b, respectively.

In the meantime, the modulator 101b for H-polarized waves performs MIMO spatial multiplexing signal processing of: inputting the two BB signals S3 and S4 to the multipliers in parallel; multiplying the signals by the four elements $V_{11}$, $V_{12}$, $V_{21}$, and $V_{22}$ of the unitary matrix V, respectively; adding the multiplied signal of S3 and $V_{11}$ and the multiplied signal of S4 and $V_{21}$ into an H-polarized signal $H_1$; and adding the multiplied signal of S3 and $V_{12}$ and the multiplied signal of S4 and $V_{22}$ into an H-polarized signal $H_2$. The H-polarized signals $H_1$ and $H_2$ obtained by the signal processing are sent to the first and second transmitting antennas 13a and 13b, respectively.

Consequently, the V-polarized signal $V_1$ and the H-polarized signal $H_1$, two independent signals in the same band, are subjected to MIMO spatial multiplexing as well as dual polarization transmission by using mutually orthogonal two polarizations of radio waves as a signal $s_1$ to be transmitted from the first transmission antenna 13a. The V-polarized signal $V_2$ and the H-polarized signal $H_2$, two independent signals in the same band; are also subjected to MIMO spatial multiplexing as well as dual polarization transmission by using mutually orthogonal two polarizations of radio waves as a signal $s_2$ to be transmitted from the second transmission antenna 13b.

Figure 12:
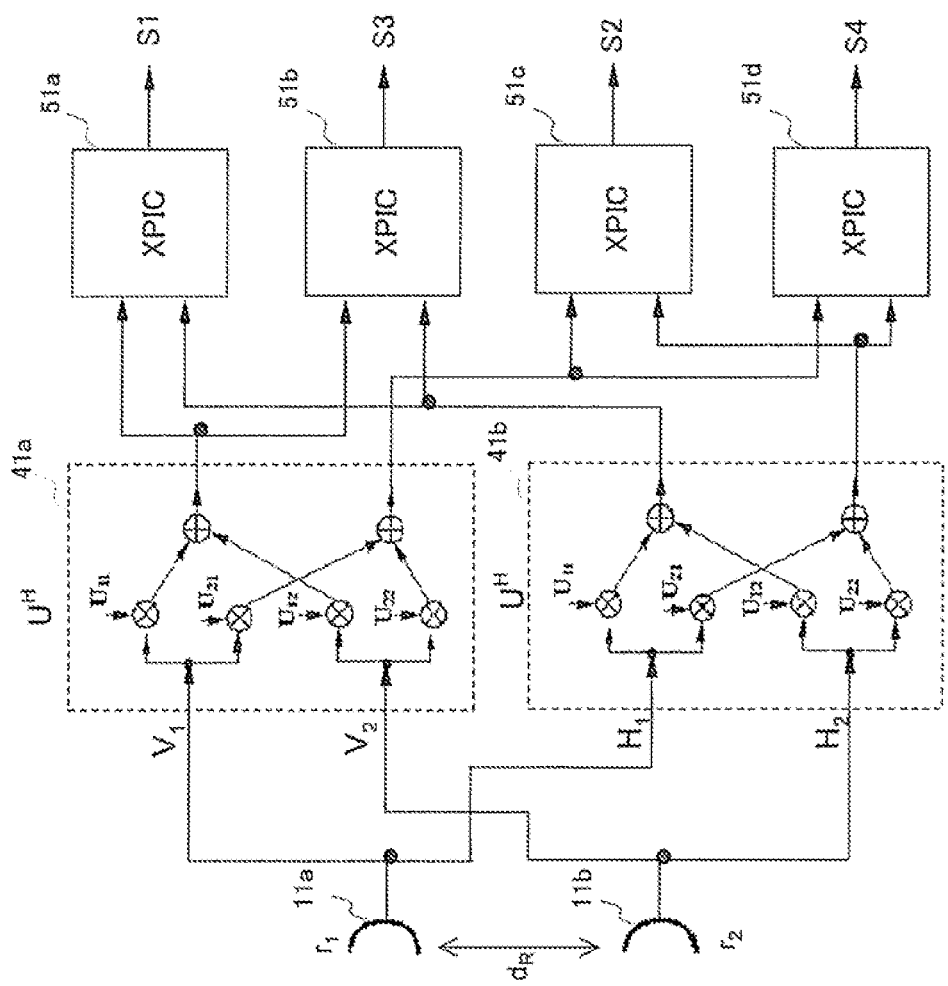
FIG. 12 A block diagram of the receiving side of the wireless communication system according to example 3 of the present invention.

FIG. 12 shows the configuration of the receiving side of the wireless communication system according to example 3 of the present invention. In the example of FIG. 12, the configuration of the receiving side of the wireless communication system according to example 1 shown in FIG. 4 is applied to the receiving side of configuration examples 1 to 3 described in PTL 1 (where the unitary matrix of the communication channel matrix H is calculated on the transmitting side, or the unitary matrix of the communication channel matrix H is calculated on the receiving side, and independent local oscillators are used for the respective antennas on the transmitting side).

As in the foregoing example 1, the receiving section of the MIMO system shown in FIG. 12 includes: two MIMO signal processing circuits 41a and 41b that perform signal processing for MIMO spatial demultiplexing on two signals $r_1$ and $r_2$ received by the two receiving antennas 11a and 11b on the receiving side; and an interference canceling section that has four XPIC circuits 51a to 51d which perform signal processing for eliminating cross polarization interference components by adaptive control. The MIMO signal processing circuits and the interfere canceling section are connected in cascade, and each signal processing is performed independently.

The two MIMO signal processing circuits 41a and 41b correspond to the MIMO signal processing circuit 41 for V-polarized waves and the MIMO signal processing circuit 42 for H-polarized waves shown in FIG. 4, respectively. The MIMO signal processing circuits 41a and 41b are each composed of a complex multiplier circuit (four multipliers that use the four elements $U_{11}$, $U_{12}$, $U_{21}$, and $U_{22}$ of the Hermitian transpose $U^H$ of the unitary matrix U as their coefficients, and two adders that add the multiplied signals).

Of these, the MIMO signal processing circuit 41a for V-polarized waves inputs the V-polarized signal $V_1$, which contains the two spatially multiplexed BB signals S1 and S2, of the signal $r_1$ received by the first receiving antenna 11a and the V-polarized signal $V_2$, which contains the two spatially multiplexed BB signals S1 and S2, of the signal $r_2$ received by the second receiving antenna 11b to the multipliers in parallel, so that the signals are multiplied by the four elements $U_{11}$, $U_{12}$, $U_{21}$, and $U_{22}$ of the matrix $U^H$, respectively. On the respective output sides, the multiplied signal of $V_1$ and $U_{11}$ and the multiplied signal of $V_2$ and $U_{12}$ are added, and the multiplied signal of $V_1$ and $U_{21}$ and the multiplied signal of $V_2$ and $U_{22}$ are added by the adders. In this way, the spatially multiplexed MIMO signals are demultiplexed. The two added signals obtained by such signal processing are sent to the XPIC circuits 51a and 51b and the XPIC circuits 51c and 51d, respectively.

In the meantime, the MIMO signal processing circuit 41b for H-polarized waves inputs the H-polarized signal $H_1$, which contains the two spatially multiplexed BB signals S3 and S4, of the signal $r_1$ received by the first receiving antenna 11a and the H-polarized signal $H_2$ of the signal $r_2$ received by the second receiving antenna 11b to the multipliers in parallel, so that the signals are multiplied by the four elements $U_{11}$, $U_{12}$, $U_{21}$, and $U_{22}$ of the matrix $U^H$, respectively. On the respective output sides, the multiplied signal of $H_1$ and $U_{11}$ and the multiplied signal of $H_2$ and $U_{12}$ are added, and the multiplied signal of $H_1$ and $U_{21}$ and the multiplied signal of $H_2$ and $U_{22}$ are added by the adders. In this way, the spatially multiplexed MIMO signals are demultiplexed. The two added signals obtained by such signal processing are sent to the XPIC circuits 51a and 51b and the XPIC circuits 51c and 51d, respectively.

The foregoing signal processing of the MIMO signal processing circuits 41a and 41b demultiplexes the spatially multiplexed signals by the matrix operation using the four elements $U_{11}$, $U_{12}$, $U_{21}$, and $U_{22}$ of the unitary matrix U, while removing the effects of variable factors on the MIMO precondition that make no temporal variation or only extremely slow variations such as an error in the installation spacing of the antennas and variations of the antenna positions in the wind.

The XPIC circuits 51a to 51d correspond to the interference canceling units (DEM XPIC1 circuits) 51 to 54 shown in FIG. 4, respectively. The XPIC circuits 51a to 51d include the same carrier recovery circuit, XDEM circuit, XPIC circuit (FIR filters and tap control circuit), and adder as described previously, and perform the following signal processing. That is, the carrier recovery circuit completely eliminates a Carrier phase rotation remaining in the own signal to demodulate. The XDEM circuit receives a digital LO signal generated by the carrier recovery circuit, and uses the LO signal to give a carrier phase rotation to the signal of the other polarization that is input as a reference signal for interference cancellation. The XPIC circuit correlates an error signal obtained from the own signal demodulated and the output signal of the XDEM circuit to create a replica of the interference component. The adder subtracts the replica of the interference component from the own signal interfered. The XPIC circuits 51a to 51d thereby output the four BB signals S1, S3, S2, and S4, respectively, that are given spatial demultiplexing and cross polarization interference cancellation.

Example 4

Figure 13:
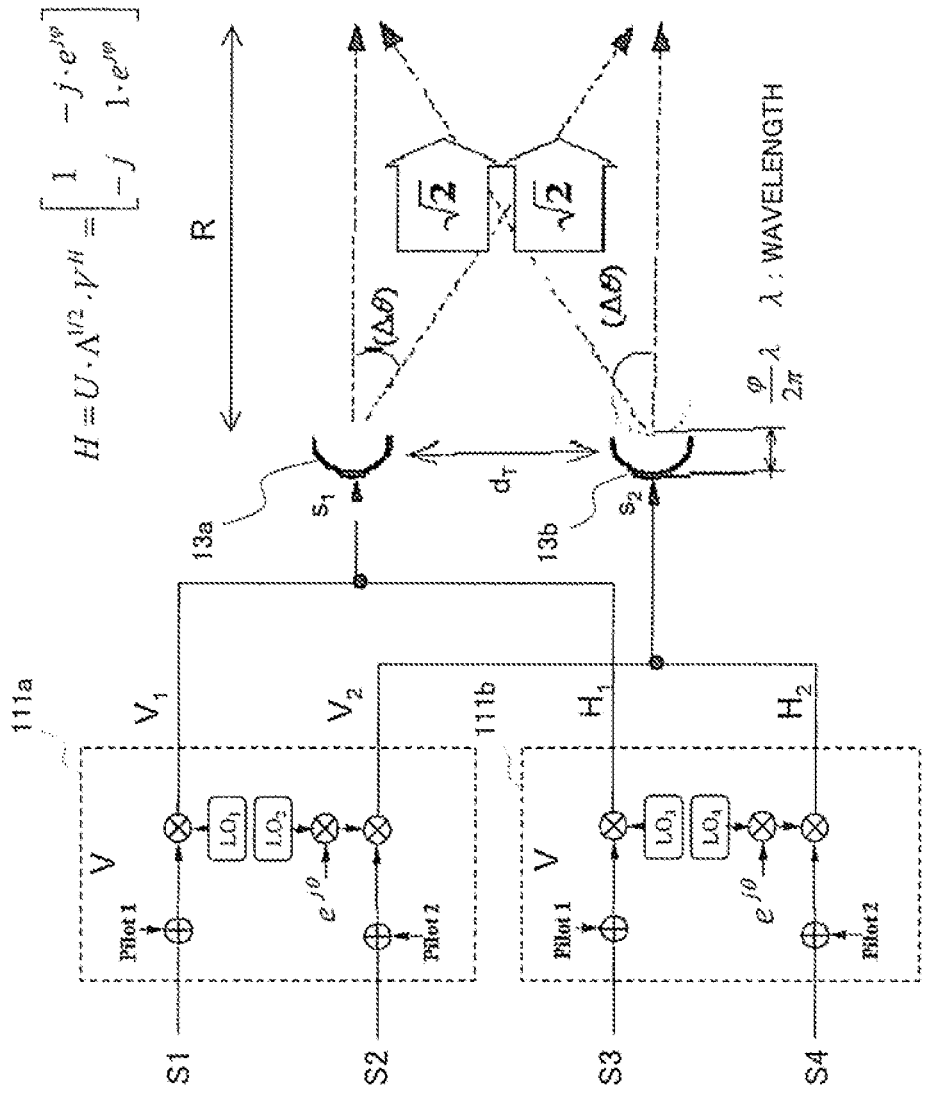
FIG. 13 A block diagram of the transmitting side of a wireless communication system according to example 4 of the present invention.

FIG. 13 shows the configuration of the transmitting side of the wireless communication system according to example 4 of the present invention. In the example of FIG. 13, the configuration of the transmitting side of the wireless communication system according to example 1 shown in FIG. 3 is applied to the transmitting side of configuration examples 3 to 5 described in PTL 1 (where the unitary matrix of the communication channel matrix H is calculated on the receiving side, and independent local oscillators are used for the respective antennas on the transmitting side or both on the transmitting side and receiving side).

As compared to example 3 of FIG. 11 seen above, the configuration of the transmitting side shown in FIG. 13 is different in that modulators 111a and 111b for V-polarized waves and H-polarized waves are provided instead of the two modulators 101a and 101b. The modulators 111a and 111b include adders that add different pilot signals (Pilot 1, Pilot 2) for the respective antennas 13a and 13b to the four input BB signals S1 to S4, and multipliers that multiply the added signals by LO signals from respective independent local oscillators ($LO_1$ to $LO_4$). In such a case, as shown in the diagram, the elements $h_{11}$, $h_{12}$, $h_{21}$, and $h_{22}$ of the communication channel matrix H ($=U\cdot\Lambda^{1/2}\cdot V^H$) of the transmission channels have a value of 1, $-j\cdot e^{j\Phi}$, $-j$, $1\cdot e^{j\Phi}$, respectively (see PTL 1 for more details on the matrix operation). The thick arrows in the diagram indicate virtual orthogonal transmission channels that are constructed with transmission channel qualities in proportion to $\sqrt{2}$ and $\sqrt{2}$.

In the modulator 111a for V-polarized waves, the adders add (insert) the respective different pilot signals (Pilot 1, Pilot 2) to the input BB signals S1 and S2, and then the multipliers multiply the resultant by mutually orthogonal LO signals (an $LO_1$ signal and an $LO_2$ signal that is multiplied by $e^{j\Phi}$) from the respective local oscillators ($LO_1$ and $LO_2$) for frequency conversion. The modulator 111a for V-polarized waves thereby generates a V-polarized signal $V_1$ corresponding to S1 and a V-polarized signal $V_2$ corresponding to S2, and outputs the signals $V_1$ and $V_2$ to the first and second transmitting antennas 13a and 13b, respectively.

Meanwhile, in the modulator 111b for H-polarized waves, the adders add (insert) the mutually orthogonal pilot signals (Pilot 1, Pilot 2) to the input BB signals S3 and S4, and then the multipliers multiply the resultant by mutually orthogonal LO signals (an $LO_3$ signal and an $LO_4$ signal that is multiplied by $e^{j\Phi}$) from the respective local oscillators ($LO_3$ and $LO_4$) for frequency conversion. The modulator 111b for H-polarized waves thereby generates an H-polarized signal $H_1$ corresponding to S3 and an H-polarized signal $H_2$ corresponding to S4, and outputs the signals $H_1$ and $H_2$ to the first and second transmitting antennas 13a and 13b, respectively.

As a result, the V-polarized signal $V_1$ and the H-polarized signal $H_1$, two independent signals in the same band, are subjected to MIMO spatial multiplexing as well as dual polarization transmission by using mutually orthogonal two polarizations of radio waves as a signal $s_1$ to be transmitted from the first transmission antenna 13a. The V-polarized signal $V_2$ and the H-polarized signal $H_2$, two independent signals in the same band, are also subjected to MIMO spatial multiplexing as well as dual polarization transmission by using mutually orthogonal two polarizations of radio waves as a signal $s_2$ to be transmitted from the second transmission antenna 13b.

Figure 14:
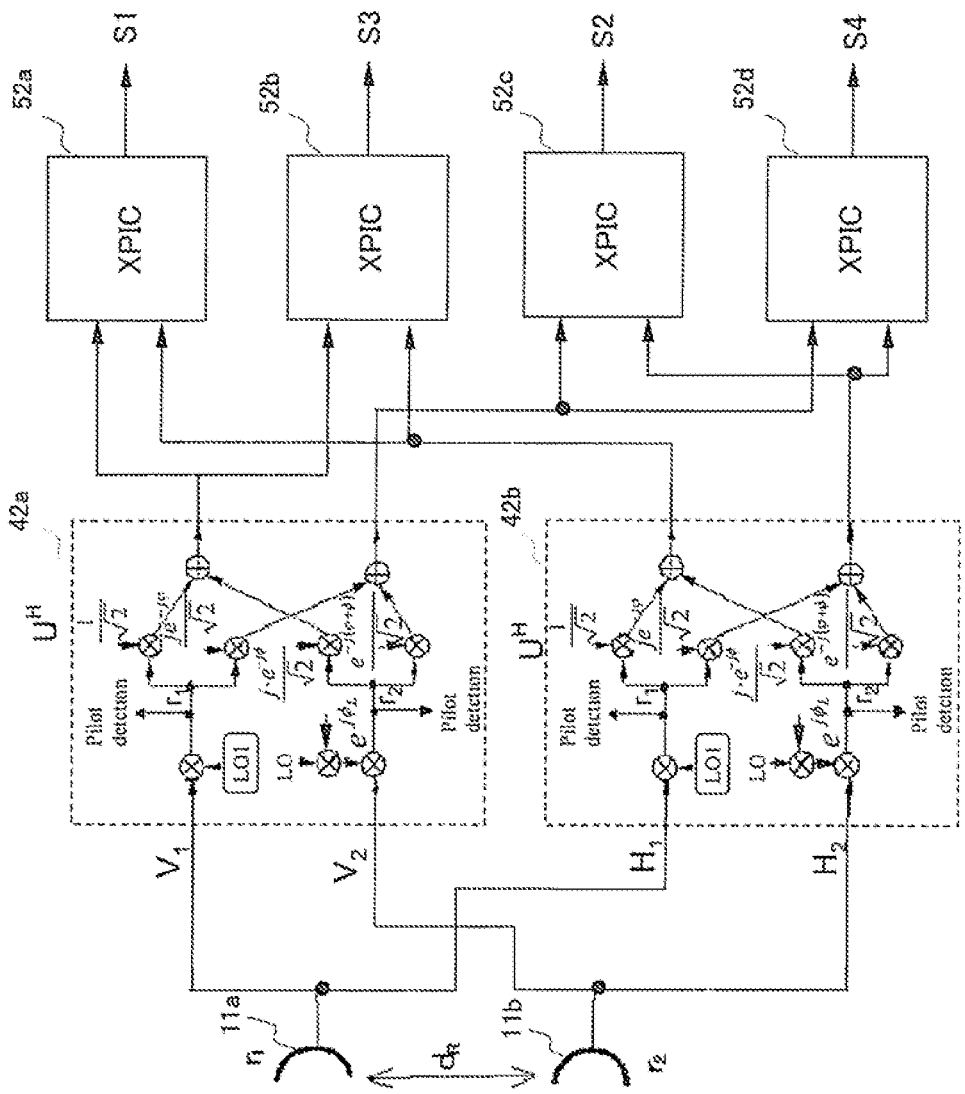
FIG. 14 A block diagram of the receiving side of the wireless communication system according to example 4 of the present invention.

FIG. 14 shows the configuration of the receiving side of the wireless communication system according to example 4 of the present invention. In the example of FIG. 14, the configuration of the receiving side of the wireless communication system according to example 1 shown in FIG. 4 is applied to the receiving side of configuration examples 4 and 5 described in PTL 1 (where the unitary matrix of the communication channel matrix H is calculated on the receiving side, and independent local oscillators are used for the respective antennas both on the transmitting side and receiving side).

As compared to example 3 of FIG. 12 seen above, the configuration of the receiving side of FIG. 14 is different in that MIMO signal processing circuits 42a and 42b for V-polarized waves and H-polarized waves and four XPIC circuits 52a to 52d are provided instead of the two MIMO signal processing circuits 41a and 41b and the four XPIC circuits 51a to 51d.

Of these, the two MIMO signal processing circuits 42a and 42b correspond to the MIMO signal processing circuit 41 for V-polarized waves and the MIMO signal processing circuit 42 for H-polarized waves shown in FIG. 4, respectively. The MIMO signal processing circuits 42a and 42b are each composed of a complex multiplier circuit (two multipliers to which mutually orthogonal LO signals are input, four multipliers that use the four elements $U_{11}$, $U_{12}$, $U_{21}$, and $U_{22}$ of the Hermitian transpose $U^H$ of the unitary matrix U as their coefficients, and two adders that add the multiplied signals). In such a case, the four elements $U_{11}$, $U_{12}$, $U_{21}$, and $U_{22}$ of the matrix $U^H$ have a value of $1/\sqrt{2}$, $je^{-j\Phi}/\sqrt{2}$, $j\cdot e^{-j\Phi}/\sqrt{2}$, and $e^{-j(\Phi+\phi)}/\sqrt{2}$, respectively. The XPIC circuits 52a to 52d correspond to the interference canceling units (DEM XPIC1 circuits) 51 to 54 shown in FIG. 4, respectively, and include the same carrier recovery circuit, XDEM circuit, XPIC circuit (FIR filters and tap control circuit), and adder as described previously.

The MIMO signal processing circuit 42a for V-polarized waves inputs the V-polarized signal $V_1$ from the first receiving antenna 11a and the V-polarized signal $V_2$ from the second receiving antenna 11b to the multipliers so that the signals are multiplied by two mutually orthogonal LO signals (an LO1 signal and an LO signal that is multiplied by $e^{j\Phi_L}$) for frequency conversion. The MIMO signal processing circuit 42a for V-polarized waves detects the pilot signals included in the respective signals $V_1$ and $V_2$ from the output signals $r_1$ and $r_2$, and then inputs the signals $r_1$ and $r_2$ to the corresponding multipliers in parallel. The multipliers then multiply the signals by the values of the four elements of the matrix $U^H$ ($1/\sqrt{2}$, $je^{-j\Phi}/\sqrt{2}$, $j \cdot e^{-j\Phi}/\sqrt{2}$, and $e^{-j(\Phi+\phi)}/\sqrt{2}$), respectively. On the output side, the multiplied signal of $r_1$ and $1/\sqrt{2}$ and the multiplied signal of $r_2$ and $j \cdot e^{-j\Phi}/\sqrt{2}$ are added, and the multiplied signal of $r_1$ and $je^{-j\Phi}/\sqrt{2}$ and the multiplied signal of $r_2$ and $e^{-j(\Phi+\phi)}/\sqrt{2}$ are added by the corresponding adders. In this way, the spatially multiplexed MIMO signals are demultiplexed. The two added signals obtained by such signal processing are sent to the XPIC circuits 52a and 52b and the XPIC circuits 52c and 52d, respectively.

Meanwhile, the MIMO signal processing circuit 42b for H-polarized waves inputs the H-polarized signal $H_1$ from the first receiving antenna 11a and the H-polarized signal $H_2$ from the second receiving antenna 11a to the multipliers so that the signals are multiplied by two mutually orthogonal LO signals (the LO1 signal and the LO signal that is multiplied by $e^{j\Phi L}$) for frequency conversion. The MIMO signal processing circuit 42b for H-polarized waves detects the pilot signals included in the respective signals $H_1$ and $H_2$ from the output signals $r$, and $r_2$, and then inputs the signals $r_1$ and $r_2$ to the corresponding multipliers in parallel. The multipliers then multiply the signals by the values of the four elements of the matrix $U^H$ ($1/\sqrt{2}$, $je^{-j\Phi}/\sqrt{2}$, $j \cdot e^{-j\Phi}/\sqrt{2}$, and $e^{-j(\Phi+\phi)}/\sqrt{2}$), respectively. On the output side, the multiplied signal of $r_2$ and $1/\sqrt{2}$ and the multiplied signal of $r_2$ and $j \cdot e^{-j\Phi}/\sqrt{2}$ are added, and the multiplied signal of $r_1$ and $je^{-j\Phi}/\sqrt{2}$ and the multiplied signal of $r_2$ and $e^{-j(\Phi+\phi)}/\sqrt{2}$ are added by the corresponding adders. In this way, the spatially multiplexed MIMO signals are demultiplexed. The two added signals obtained by such signal processing are sent to the XPIC circuits 52a and 52b and the XPIC circuits 52c and 52d, respectively.

The foregoing signal processing of the MIMO signal processing circuits 42a and 42b demultiplexes the spatially multiplexed signals by the matrix operations using the four elements of the unitary matrix U, while removing the effects of variable factors on the MIMO precondition that make no temporal variations or only extremely slow variations such as an error in the installation spacing of the antennas and variations of the antenna positions in the wind.

The XPIC circuits 52a to 52d correspond to the interference canceling units (DEM XPIC1 circuits) 51 to 54 shown in FIG. 4, respectively. The XPIC circuits 52a to 52d include the same carrier recovery circuit, XDEM circuit, XPIC circuit (FIR filters and tap control circuit), and adder as described previously, and perform the following signal processing. That is, the carrier recovery circuit completely eliminates a carrier phase rotation remaining in the own signal to demodulate. The XDEM circuit receives a digital LO signal generated by the carrier recovery circuit, and uses the LO signal to give a carrier phase rotation to the signal of the other polarization that is input as a reference signal for interference cancellation. The XPIC circuit correlates an error signal obtained from the own signal demodulated and the output signal of the XDEM circuit to create a replica of the interference component. The adder subtracts the replica of the interference component from the own signal interfered. The XPIC circuits 52a to 52d thereby output the four BB signals S1, S3, S2, and S4, respectively, that are given spatial demultiplexing and cross polarization interference cancellation.

Consequently, the present example provides the same operation and effects as those of the foregoing third example 3. In addition, the pilot signals are generated before the processing of the local oscillators on the transmitting side without feedback information from the receiving side to the transmitting side. The pilot signals are detected after the processing of the local oscillators on the receiving side. The configuration of not operating a unitary matrix on the transmitting side can thus form mutually orthogonal transmission channels despite the use of independent local oscillators on the transmitting side and the use of independent local oscillators on the receiving side.

Example 5

Figure 15:
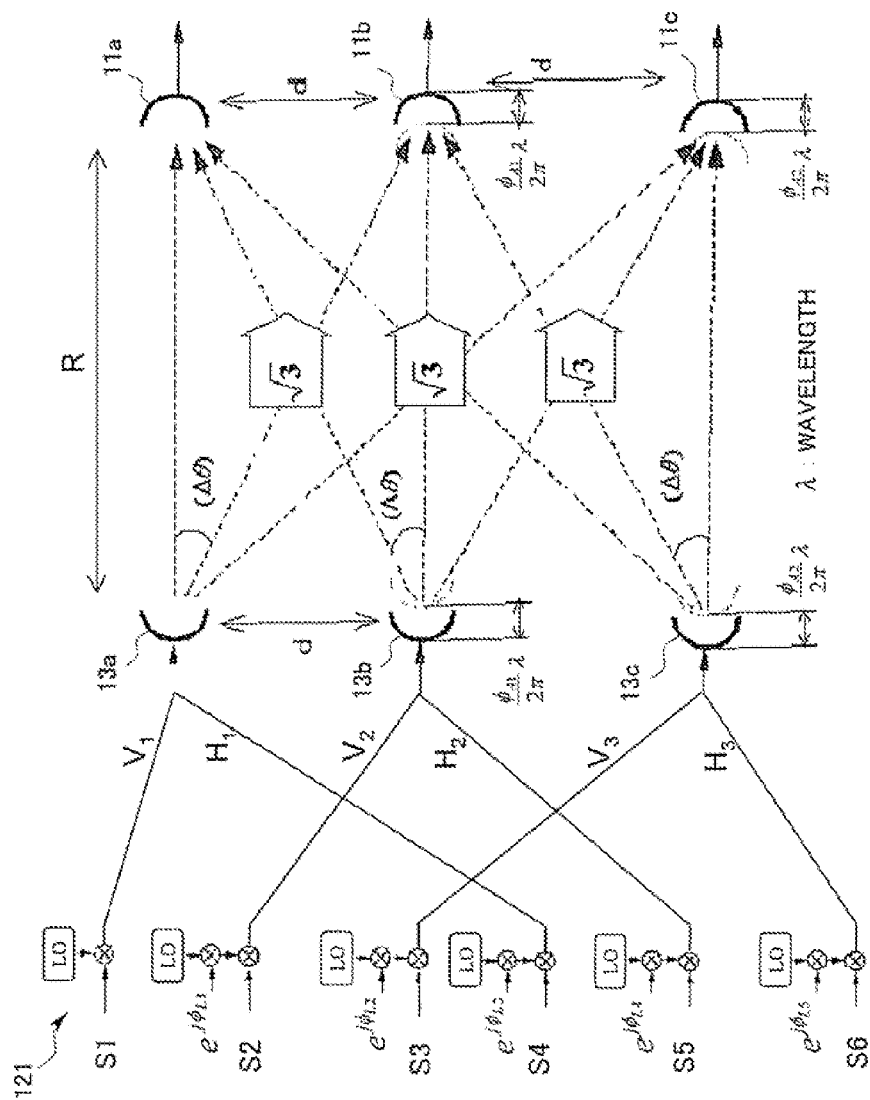
FIG. 15 A block diagram of the transmitting side of a wireless communication system according to example 5 of the present invention.

FIG. 15 shows the configuration of the transmitting side of the wireless communication system according to example 5 of the present invention. In the example of FIG. 15, the configuration of the transmitting side of the wireless communication system according to example 1 shown in FIG. 3 is applied to the transmitting side of configuration examples 6 and 7 described in PTL 1 (with three or four antennas, where the unitary matrix is calculated on the receiving side and independent local oscillators are used for the respective antennas on the transmitting side or both on the transmitting side and receiving side).

As compared to example 4 of FIG. 13 seen above, the configuration of the transmitting side shown in FIG. 15 is different in that a third transmitting antenna 13c is provided in addition to the two transmitting antennas 13a and 13b, and that a modulator 121 is provided instead of the two modulators 111a and 111b for V-polarized waves and H-polarized waves. The modulator 121 includes a plurality of multipliers that multiply six input BB signals by mutually orthogonal LO signals from respective independent local oscillators (LO). The thick arrows in the diagram indicate virtual orthogonal transmission channels that are constructed with transmission channel qualities in proportion to $\sqrt{3}$, $\sqrt{3}$, and $\sqrt{3}$.

The modulator 121 performs the following processing on the six input BB signals S1 to S6.

1) Using a multiplier, multiply the BB signal S1 by an LO signal from a local oscillator (LO), and output the multiplied signal to the first transmitting antenna 13a as a V-polarized signal $V_1$.

2) Using a multiplier, multiply the BB signal S2 by an output that is obtained by multiplying an LO signal from a local oscillator (LO) by $e^{j\Phi L1}$, and output the multiplied signal to the second transmitting antenna 13b as a V-polarized signal $V_2$.

3) Using a multiplier, multiply the BB signal S3 by an output that is obtained by multiplying an LO signal from a local oscillator (LO) by $e^{j\Phi L2}$, and output the multiplied signal to the third transmitting antenna 13c as a V-polarized signal $V_3$.

4) Using a multiplier, multiply the BB signal S4 by an output that is obtained by multiplying an LO signal from a local oscillator (LO) by $e^{j\Phi L3}$, and output the multiplied signal to the first transmitting antenna 13a as an H-polarized signal $H_1$.

5) Using a multiplier, multiply the BB signal S5 by an output that is obtained by multiplying an LO signal from a local oscillator (LO) by $e^{j\Phi L4}$, and output the multiplied signal to the second transmitting antenna 13b as an H-polarized signal $H_2$.

6) Using a multiplier, multiply the BB signal S6 by an output that is obtained by multiplying an LO signal from a local oscillator (LO) by $e^{j\Phi L5}$, and output the multiplied signal to the third transmitting antenna 13c as an H-polarized signal $H_3$.

Consequently, the V-polarized signal $V_1$ and the H-polarized signal $H_1$, two independent signals in the same band, are subjected to MIMO spatial multiplexing as well as dual polarization transmission by using mutually orthogonal two polarizations of radio waves as a signal $s_1$ to be transmitted from the first transmission antenna 13a.

The V-polarized signal $V_2$ and the H-polarized signal $H_2$, two independent signals in the same band, are also subjected to MIMO spatial multiplexing as well as dual polarization transmission by using mutually orthogonal two polarizations of radio waves as a signal $s_2$ to be transmitted from the second transmission antenna 13b.

Furthermore, the V-polarized signal $V_3$ and the H-polarized signal $H_3$, two independent signals in the same band, are subjected to MIMO spatial multiplexing as well as dual polarization transmission by using mutually orthogonal two polarizations of radio waves as a signal $s_3$ to be transmitted from the third transmission antenna 13c.

Figure 16:
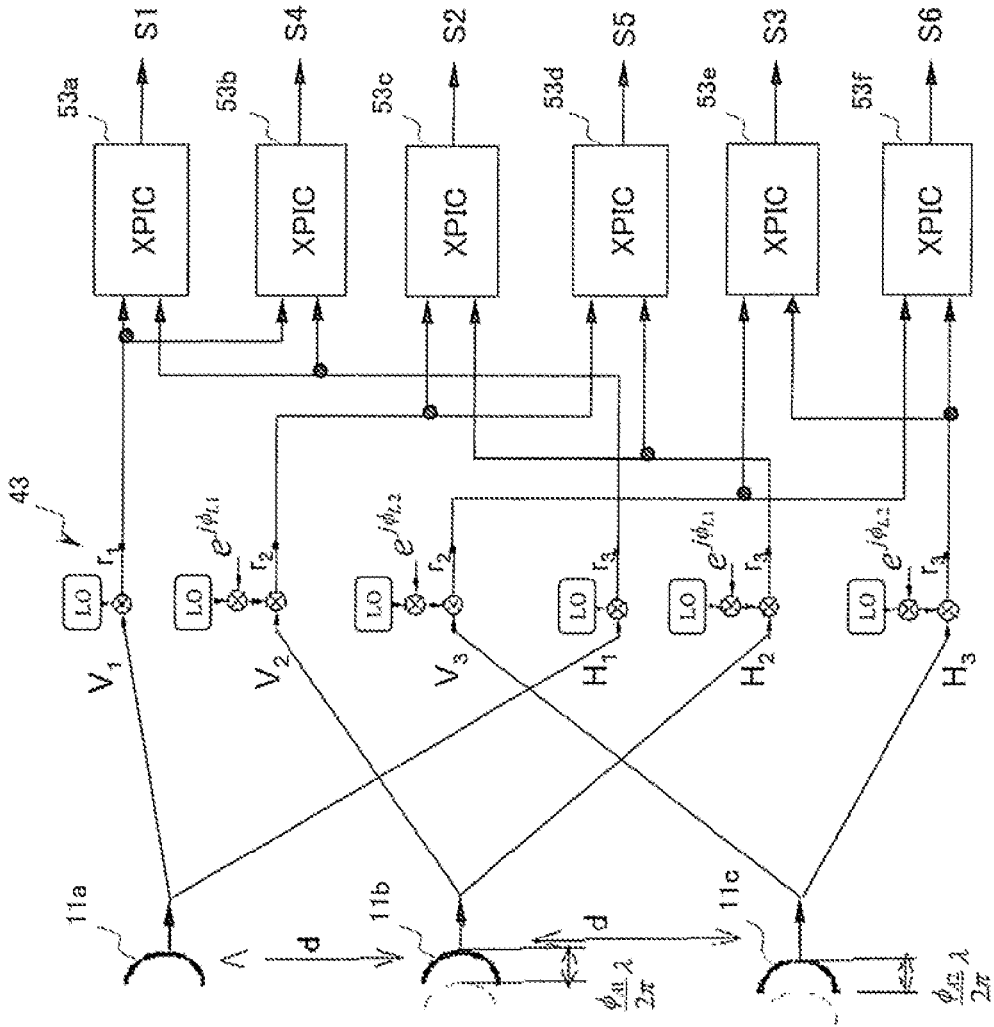
FIG. 16 A block diagram of the receiving side of the wireless communication system according to example 5 of the present invention.

FIG. 16 shows the configuration of the receiving side of the wireless communication system according to example 5 of the present invention. In the example of FIG. 16, the configuration of the receiving side of the wireless communication system according to example 1 shown in FIG. 4 is applied to the receiving side of configuration examples 6 to 7 described in PTL 1 (with three or four antennas, where the unitary matrix is calculated on the receiving side and independent local oscillators are used for the respective antennas on the transmitting side or both on the transmitting side and receiving side).

As compared to example 4 of FIG. 14 seen above, the configuration of the receiving side of FIG. 16 is different in that a third receiving antenna 11c is provided in addition to the two receiving antennas 11a and 11b, and that a MIMO signal processing circuit 43 and six XPIC circuits 53a to 53d are provided instead of the two MIMO signal processing circuits 42a and 42b and the four XPIC circuits 52a to 52d.

The MIMO signal processing circuit 43 performs the following processing.

1) Using a multiplier, multiply the V-polarized signal $V_1$ from the first receiving antenna 11a by an LO signal from a local oscillator (LO), and output the output signal $r_1$ to the two XPIC circuits 53a and 53b.

2) Using a multiplier, multiply the V-polarized signal $V_2$ from the second receiving antenna 11b by a signal that is obtained by multiplying an LO signal from a local oscillator (LO) by $e^{j\Phi L1}$, and output the output signal $r_2$ to the two XPIC circuits 53c and 53d.

3) Using a multiplier, multiply the V-polarized signal $V_3$ from the third receiving antenna 11c by a signal that is obtained by multiplying an LO signal from a local oscillator (LO) by $e^{j\Phi L2}$, and output the output signal $r_2$ to the XPIC circuits 53e and 53f.

4) Using a multiplier, multiply the H-polarized signal $H_1$ from the first receiving antenna 11a by an LO signal from a local oscillator (LO), and output the output signal $r_3$ to the two XPIC circuits 53a and 53b.

5) Using a multiplier, multiply the H-polarized signal $H_2$ from the second receiving antenna 11b by a signal that is obtained by multiplying an LO signal from a local oscillator (LO) by $e^{j\Phi L1}$, and output the output signal $r_3$ to the two XPIC circuits 53c and 53d.

6) Using a multiplier, multiply the H-polarized signal $H_3$ from the third receiving antenna 11c by a signal that is obtained by multiplying an LO signal from a local oscillator (LO) by $e^{j\Phi L2}$, and output the output signal $r_3$ to the two XPIC circuits 53e and 53f.

The XPIC circuits 53a to 53f correspond to the interference canceling units (DEM XPIC1 circuits) 51 to 54 shown in FIG. 4. The XPIC circuits 53a to 53f include the same carrier recovery circuit, XDEM circuit, XPIC circuit (FIR filters and tap control circuit), and adder as described previously, and perform the following signal processing. That is, the carrier recovery circuit completely eliminates a carrier phase rotation remaining in the own signal to demodulate. The XDEM circuit receives a digital LO signal generated by the carrier recovery circuit, and uses the LO signal to give a carrier phase rotation to the signal of the other polarization that is input as a reference signal for interference cancellation. The XPIC circuit correlates an error signal obtained from the own signal demodulated and the output signal of the XDEM circuit to create a replica of the interference component. The adder subtracts the replica of the interference component from the own signal interfered. The XPIC circuits 53a to 53f thereby output the six BB signals S1, S4, S2, S5, S3, and S6, respectively, that are given spatial demultiplexing and cross polarization interference cancellation.

Consequently, the present example can provide the same operation and effects as those of the foregoing third example 3.

Up to this point, the present invention has been described with reference to the foregoing examples. However, the present invention is not limited to the foregoing examples. The configuration and details of the present invention are subject to various modifications understandable to those skilled in the art within the scope of the invention.

This application is the National Phase of PCT/JP2008/071782, filed Dec. 1, 2008, which is based upon and claims the benefit of priority from prior Japanese Patent Application No. 2007-310697, filed on Nov. 30, 2007, the entire contents of which are incorporated herein.

INDUSTRIAL APPLICABILITY

The present invention is applicable to a wireless communication system that uses microwaves or millimeter waves and performs transmission of higher volumes within a limited band.

The invention claimed is:

1. A MIMO (Multiple-Input Multiple-Output) wireless communication system that uses a plurality of antennas to form a plurality of fixed transmission channels, the wireless communication system comprising:
  a transmitting section that performs MIMO spatial multiplexing as well as dual polarization transmission of transmitting two independent signals in the same band by using two mutually orthogonal polarizations of radio waves as signals to be transmitted from respective antennas on a transmitting side; and
  a receiving section that includes an interference canceller which performs signal processing for eliminating an interference component between the polarizations by adaptive control on signals received by respective antennas on a receiving side, and a MIMO signal processing circuit which performs signal processing for demultiplexing of the MIMO spatial multiplexing independent of the signal processing of the interference canceller,
  wherein the MIMO wireless communication system is a fixed system that performs deterministic MIMO transmission in a fixed line-of-sight environment, the plurality of fixed transmission channels are line-of-sight deterministic communication channels, and an installation spacing of the plurality of antennas is set so that signals transmitted from two antennas on the transmitting side are received by a single antenna on the receiving side with a predetermined phase difference,
  wherein the interference canceller and the MIMO signal processing circuit are connected in cascade and the MIMO signal processing circuit is arranged in a stage subsequent to the interference canceller.

2. The wireless communication system according to claim 1, wherein pilot signals periodically inserted into series of transmitting signals that constitute the signals to be transmitted from the transmitting side are series of signals that are mutually orthogonal between all the signals to be transmitted, the pilot signals being inserted in order to obtain information on a communication channel matrix of the transmission channels.

3. The wireless communication system according to claim 1, wherein:
the MIMO signal processing circuit detects phase information intended for spatial demultiplexing irrespective of interference between the polarizations by determining a plurality of elements of a communication channel matrix from pilot signals, and demultiplexes two spatially-multiplexed independent signals by using the phase information detected; and
the interference canceller eliminates the interference component between the polarizations by creating and adjusting a replica of the interference component to a change of the interference component, and subtracting the replica from an interfered signal of an own polarization.

4. The wireless communication system according to claim 1, wherein:
the MIMO wireless communication system is constructed as a LOS (Line-of-Sight) MIMO wireless communication system;
the plurality of fixed transmission channels are formed in line of sight of the LOS MIMO wireless communication system; and
signals transmitted from the transmitting section or signals received by the receiving section are microwave or millimeter wave.

5. The wireless communication system according to claim 1, wherein:
the transmitting section includes a section which periodically inserts pilot signals into series of transmitting signals from the transmitting section; and
the receiving section includes a section which calculates phase information on the basis of signals received by respective antennas, and performs signal processing for demultiplexing of the MIMO spatial multiplexing independent of the signal processing of the interference canceller by using the calculated phase information.

6. A receiving apparatus of a MIMO (Multiple-Input Multiple-Output) communication system that uses a plurality of antennas to form a plurality of fixed transmission channels, the receiving apparatus comprising:
an interference canceller that performs signal processing for eliminating an interference component between two mutually orthogonal polarizations of radio waves by adaptive control on signals received by respective antennas on a receiving side; and
a MIMO signal processing circuit that is connected to the interference canceller and performs signal processing for MIMO spatial demultiplexing independent of the signal processing of the interference canceller,
wherein the MIMO wireless communication system is a fixed system that performs deterministic MIMO transmission in a fixed line-of-sight environment, the plurality of fixed transmission channels are line-of-sight deterministic communication channels, and an installation spacing of the plurality of antennas is set so that signals transmitted from two antennas on a transmitting side are received by a single antenna on the receiving side with a predetermined phase difference,
wherein the interference canceller and the MIMO signal processing circuit are connected in cascade and the MIMO signal processing circuit is arranged in a stage subsequent to the interference canceller.

7. The receiving apparatus according to claim 6, wherein:
the MIMO signal processing circuit detects phase information intended for spatial demultiplexing irrespective of interference between the polarizations by determining a plurality of elements of a communication channel matrix from pilot signals, and demultiplexes two spatially-multiplexed independent signals by using the phase information detected; and
the interference canceller eliminates the interference component between the polarizations by creating and adjusting a replica of the interference component to a change of the interference component, and subtracting the replica from an interfered signal of an own polarization.

8. A wireless communication method of a MIMO (Multiple-Input Multiple-Output) communication system that uses a plurality of antennas to form a plurality of fixed transmission channels, the method comprising:
performing MIMO spatial multiplexing as well as dual polarization transmission of transmitting two independent signals in the same band by using two mutually orthogonal polarizations of radio waves as signals to be transmitted from respective antennas on a transmitting side; and
performing signal processing for eliminating an interference component between the polarizations by adaptive control on signals received by respective antennas on a receiving side and signal processing for demultiplexing of the MIMO spatial multiplexing independently of each other,
wherein the MIMO wireless communication system is a fixed system that performs deterministic MIMO transmission in a fixed line-of-sight environment, the plurality of fixed transmission channels are line-of-sight deterministic communication channels, and an installation spacing of the plurality of antennas is set so that signals transmitted from two antennas on the transmitting side are received by a single antenna on the receiving side with a predetermined phase difference,
wherein the MIMO spatial multiplexing is performed subsequently to the performing of the signal processing for eliminating an interference component.

9. A receiving method of a MIMO (Multiple-Input Multiple-Output) communication system that uses a plurality of antennas to form a plurality of fixed transmission channels, the method comprising
performing signal processing for eliminating an interference component between the polarizations by adaptive control on signals received by respective antennas on a receiving side and signal processing for MIMO spatial demultiplexing independently of each other,
wherein the MIMO wireless communication system is a fixed system that performs deterministic MIMO transmission in a fixed line-of-sight environment, the plurality of fixed transmission channels are line-of-sight deterministic communication channels, and an installation spacing of the plurality of antennas is set so that signals transmitted from two antennas on a transmitting side are received by a single antenna on the receiving side with a predetermined phase difference,
wherein the MIMO spatial multiplexing is performed subsequently to the performing of the signal processing for eliminating an interference component.

10. A demodulator of a MIMO (Multiple-Input Multiple-Output) communication system that uses a plurality of antennas to form a plurality of fixed transmission channels, the demodulator comprising:
- an interference canceller that performs signal processing for eliminating an interference component between two mutually orthogonal polarizations of radio waves by adaptive control; and
- a MIMO signal processing circuit that is connected to the interference canceller and performs signal processing for MIMO spatial demultiplexing independent of the signal processing of the interference canceller,
- wherein the MIMO wireless communication system is a fixed system that performs deterministic MIMO transmission in a fixed line-of-sight environment, the plurality of fixed transmission channels are line-of-sight deterministic communication channels, and an installation spacing of the plurality of antennas is set so that signals transmitted from two antennas on a transmitting side are received by a single antenna on a receiving side with a predetermined phase difference,
- wherein the interference canceller and the MIMO signal processing circuit are connected in cascade and the MIMO signal processing circuit is arranged in a stage subsequent to the interference canceller.

11. A signal processing circuit of a MIMO (Multiple-Input Multiple-Output) communication system that uses a plurality of antennas to form a plurality of fixed transmission channels, the signal processing circuit comprising:
- an interference canceller that performs signal processing for eliminating an interference component between two mutually orthogonal polarizations of radio waves by adaptive control; and
- a MIMO signal processing circuit that is connected to the interference canceller and performs signal processing for MIMO spatial demultiplexing independent of the signal processing of the interference canceller,
- wherein the MIMO wireless communication system is a fixed system that performs deterministic MIMO transmission in a fixed line-of-sight environment, the plurality of fixed transmission channels are line-of-sight deterministic communication channels, and an installation spacing of the plurality of antennas is set so that signals transmitted from two antennas on a transmitting side are received by a single antenna on a receiving side with a predetermined phase difference,
- wherein the interference canceller and the MIMO signal processing circuit are connected in cascade and the MIMO signal processing circuit is arranged a stage subsequent to the interference canceller.

12. A semiconductor device comprising the signal processing circuit according to claim 11.

* * * * *